US 6,606,902 B2

(12) United States Patent
Koeune et al.

(10) Patent No.: US 6,606,902 B2
(45) Date of Patent: Aug. 19, 2003

(54) METHOD OF IMPROVING STEERING PERFORMANCE ROBUSTNESS UTILIZING STIFFNESS NON-UNIFORMITY IN TIRE/WHEEL

(75) Inventors: Thierry Koeune, Fauvillers (BE); Romain Kunsch, Mersch (LU); Edouard Michel, Copley, OH (US); Bernard Croissant, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/901,383

(22) Filed: Jul. 9, 2001

(65) Prior Publication Data

US 2003/0005757 A1 Jan. 9, 2003

(51) Int. Cl.[7] .............................................. G01M 17/02
(52) U.S. Cl. ......................................... 73/146; 152/517
(58) Field of Search .......................... 73/146, 462, 459; 152/517

(56) References Cited

U.S. PATENT DOCUMENTS

| | | | |
|---|---|---|---|
| 3,631,716 A | 1/1972 | Monajjem | |
| 3,945,422 A | 3/1976 | Pottinger | |
| 4,004,958 A | 1/1977 | Jones et al. | |
| 4,016,020 A | 4/1977 | Ongaro | |
| 4,154,206 A | 5/1979 | L Salver et al. | |
| 4,479,381 A | 10/1984 | Kounkel et al. | |
| 4,513,802 A | 4/1985 | Togashi et al. | |
| 4,655,080 A * | 4/1987 | Ongaro | 73/462 |
| 4,815,004 A | 3/1989 | Beebe | |
| 4,817,429 A | 4/1989 | Goebel | |
| 4,907,452 A | 3/1990 | Yopp | |
| 5,060,510 A | 10/1991 | Rousseau | |
| 5,062,462 A | 11/1991 | Rye et al. | |
| 5,209,462 A | 5/1993 | Le Fol et al. | |
| 5,229,954 A * | 7/1993 | Beebe | 700/280 |
| 5,237,505 A * | 8/1993 | Beebe | 73/462 |
| 5,242,158 A | 9/1993 | Robic et al. | |
| 5,273,094 A | 12/1993 | Chavet | |
| 5,297,769 A | 3/1994 | Le Fol et al. | |
| 5,321,628 A | 6/1994 | Beebe | |
| 5,620,539 A * | 4/1997 | Ide | 152/541 |
| 5,660,651 A | 8/1997 | Diensthuber | |
| 5,698,051 A | 12/1997 | Tanaka | |
| 5,851,324 A * | 12/1998 | Oare et al. | 152/517 |
| 5,879,488 A | 3/1999 | Weston et al. | |
| 5,941,338 A | 8/1999 | Miller et al. | |
| 5,942,681 A | 8/1999 | Vollenweider et al. | |
| 2002/0036385 A1 * | 3/2002 | Mackle et al. | 280/5.521 |
| 2002/0079038 A1 * | 6/2002 | Kato | 152/540 |

FOREIGN PATENT DOCUMENTS

FR     2765292     12/1998

* cited by examiner

Primary Examiner—Edward Lefkowitz
Assistant Examiner—Alandra Ellington
(74) Attorney, Agent, or Firm—Howard M. Cohn

(57) ABSTRACT

Methods for improving vehicle steering performance and robustness through control of non-uniformities in the vehicle's tires, wheels and tire/wheel assemblies. While minimizing lateral force variations (e.g., couple imbalance), a controlled amount of radial and/or tangential force variation is induced in one or more tire/wheel assemblies by imparting mass non-uniformnity, dimensional non-uniformity, and/or stiffness non-uniformity. The tire non-uniformities are preferably distributed meridionally symmetrically about the equatorial plane of the tire, so as to induce tangential and/or radial force variations but not lateral force variations. Beneficial tangential and/or radial force variations will result from the operation of such a tire, even if the tire/wheel assembly is balanced by weights added to the wheel. The stiffness non-uniformity is preferably imparted in the tire by one or more heavy splices, and/or extra pieces of fabric applied to the carcass or tread, and/or sectors of tire components having different stiffness.

12 Claims, 7 Drawing Sheets

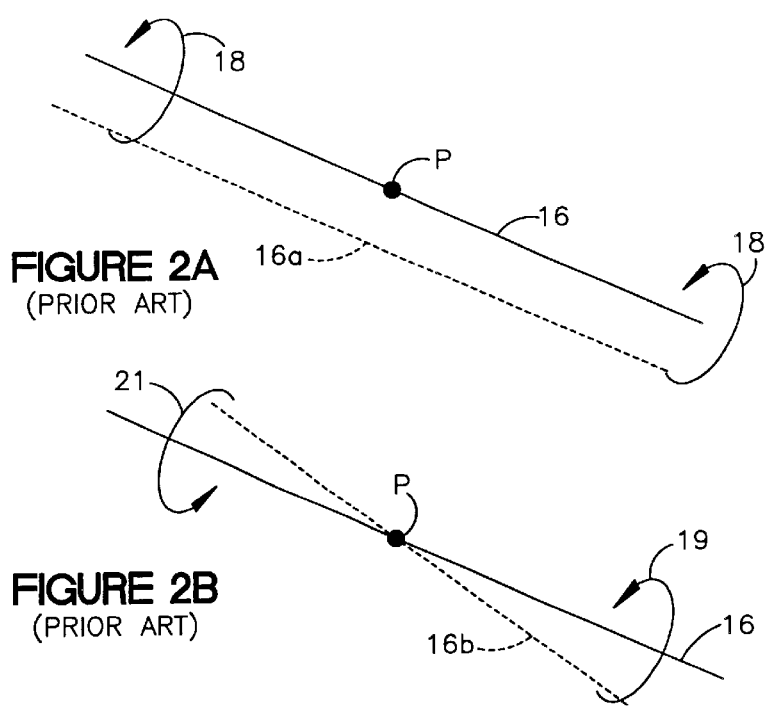
FIGURE 2A
(PRIOR ART)
FIGURE 2B
(PRIOR ART)
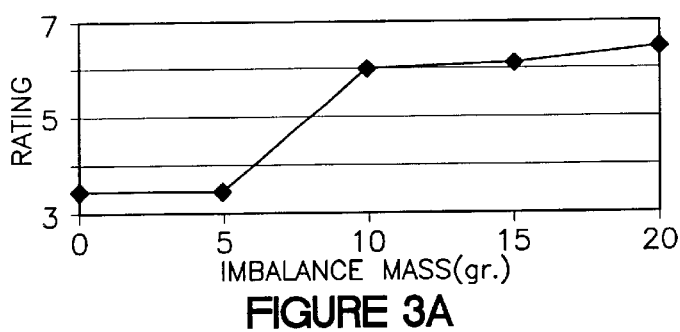
FIGURE 3A
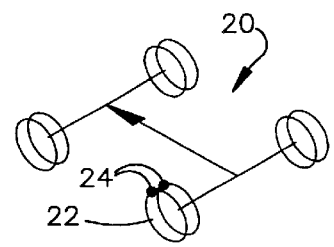
FIGURE 3B
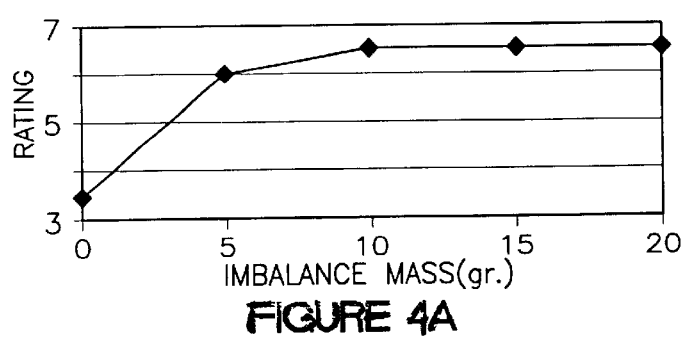
FIGURE 4A
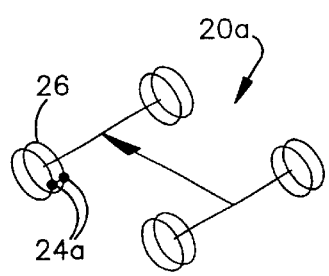
FIGURE 4B

METHOD OF IMPROVING STEERING PERFORMANCE ROBUSTNESS UTILIZING STIFFNESS NON-UNIFORMITY IN TIRE/WHEEL

CROSS-REFERENCE TO RELATED APPLICATIONS

This application relates to applications entitled METHOD OF IMPROVING STEERING PERFORMANCE ROBUSTNESS UTILIZING MASS NON-UNIFORMITY IN TIRE/WHEEL, and METHOD OF IMPROVING STEERING PERFORMANCE ROBUSTNESS UTILIZING DIMENSIONAL NON-UNIFORMITY IN TIRE/WHEEL, both having a filing date concurrent with that of the present application.

TECHNICAL FIELD OF THE INVENTION

This invention relates to methods of improving the steering performance of vehicles, particularly passenger vehicles having pneumatic tires.

BACKGROUND OF THE INVENTION

The term "steering performance" (or simply "steering") refers to a vehicle driver's feeling that a vehicle's steering (and/or "handling") is responsive to movement of the steering wheel. The better the steering performance, the better the driver's "feeling" of having control over the vehicle's steering. Because it relates to a "feeling" on the part of a driver, steering performance is essentially a subjective evaluation of a vehicle's steering. Steering performance can change over time, mainly deteriorating as components in the vehicle steering system wear, age, or suffer damage. Steering system components include the steering wheel, the tires and wheels, and everything in between such as the steering box, any power assist components, and linkages and joints. Steering performance can also vary with operating conditions, including, for example, road texture, vehicle speed, steering wheel settings, minor tire inflation pressure changes, and tire/wheel uniformity changes (e.g., balance).

Worsening steering performance is generically referred to as "steering performance loss" (SP-Loss), or "give-up". A steering system or component which is resistant to steering performance loss is "robust" or can be said to possess "steering performance robustness". Similarly, any component change which appears to delay or prevent SP-Loss in a vehicle steering system can be said to improve steering performance robustness. Also, it has to be mentioned that SP-Loss is more noticeable on vehicles which have, in general, a very good and crisp steering. Finally, it has been noted that steering component changes which improve steering performance robustness usually also enhance the driver's perception of steering performance. The inverse may not be true, i.e., a component change which enhances steering performance initially may not be robust and therefore quickly deteriorates to yield a net steering performance loss.

Steering performance loss is mostly a concern in passenger vehicles with pneumatic tires and power assisted steering (power steering), although the phenomenon has also been observed in passenger vehicles without power steering. Although a trained driver can determine steering performance at virtually any vehicle speed, the steering performance (and therefore a change in performance, e.g., SP-Loss) is most noticeable above a certain vehicle speed threshold. Even though SP-Loss is generally a change over time, it can be practically instantaneous.

Certain vehicles appear to be more susceptible to SP-Loss, and it has been noted (especially on these vehicles) that steering performance is affected by differences in tire construction, or even by changes from one tire to another of the same tire construction. (The common industry term "tire construction" includes all elements of a tire's design—including, for example, tire/carcass shape, tread pattern, number and type of plies, materials and manufacturing methods used, etc.) It is well known that tire uniformity (e.g., balance) varies from tire to tire, and that an unbalanced tire causes vibrations which are felt in the steering, therefore tire uniformity is almost universally controlled in tire and wheel design, during tire and wheel manufacturing, and after forming a tire/wheel assembly. It is generally assumed that improved tire/wheel uniformity will improve steering performance and hopefully will also help with steering performance robustness. As noted above, this is not always the case, and thus a great deal of research has been directed toward additional solutions to SP-Loss, such as various tire design changes.

Regardless of tire construction/design, the tire and vehicle industry generally strives for the best possible tire uniformity and, by extension, uniformity of the tire/wheel assembly whenever a tire is mounted on a wheel for use on a vehicle. This is a multi-part optimization process whereby the tire manufacturer strives for optimum tire uniformity, the wheel manufacturer strives for optimum wheel uniformity, and then the vehicle operator has the tire/wheel assembly tested and corrected for "balance".

Tire uniformity and tire/wheel balance are well known topics in the tire industry. A brief description of certain relevant portions of these topics will now be presented.

Uniformity and Balance

Tire manufacturers generally perform quality checks on tires at various points during the manufacturing process. Tire uniformity is an important, performance-related check typically performed on a tire uniformity machine (TUM) which is well-known in the art and will not be described in detail herein. Tire uniformity machines most commonly rotate a tire mounted on a known-to-be-uniform or "true running" wheel, and measure variations in forces on the wheel axis (or on a load wheel) and/or measure variations in tire outer surface positions. Typical force variation measurements include radial force variation (RFV) which is indicative, for example, of static imbalance or radial runout; and lateral force variation (LFV) which is indicative, for example, of couple imbalance, lateral runout, or tire radial runout skewness. Tire surface measurements are directly indicative of runout conditions and conicity. Another measurement, generally done on a sampling basis on special laboratory grade, high speed TUMs, is tangential force variation (TFV), or fore-aft force variation which is experienced at the surface of contact between a tire and a road surface in a direction both tangential to the tire tread and perpendicular to the tire axis of rotation.

In terms of effect on a vehicle and its tires, all of the types of force variations can cause vibrations dependent upon the magnitude of the force variation (modified by vehicle characteristics such as wheel suspension mass/stiffness/damping conditions). The lateral force variation (and/or couple imbalance) primarily cause vibrations due to a wobbling motion of the tire, with the axis of rotation for the oscillation being vertical or horizontal, parallel to the tire's circumferential plane, and approximately centered within the tire/wheel volume. In contrast, radial and tangential force variation and/or static imbalance mainly cause vibrations due to movement in vertical and fore-aft directions (although some lateral movements exist, they are distributed symmetrically about the equatorial plane and involve only a small percentage of the total tire/wheel assembly mass).

Static and Couple Imbalances

Generally speaking, when a tire/wheel assembly is "balanced", the modern practice is to test, and correct if necessary, both the static and the couple balance of the assembly. This balancing is generally performed using special-purpose equipment. For couple balancing, the equipment generally rotates the tire/wheel assembly at a relatively high speed, and the tire is not in contact with any surface (compare to the road-wheel used in TUM testing).

Static imbalance arises in a rotational system such as a tire and wheel assembly when the mass of the rotating tire/wheel assembly is non-uniformly distributed about the axis of rotation in such a way that the sum of the centrifugal force vectors arising from each moving part of the rotating system is non-zero. The term "static," when used in reference to rotational balance, refers to the fact that rotational motion is not needed to identify, locate and correct the rotational imbalance. That is, a wheel that has a static imbalance will, at certain stationary angular orientations about the horizontal axis of rotation, exert a torque vector about the axis of rotation, due to gravity forces. An optimally balanced tire/wheel system will produce no such torque vector about the axis of rotation. Of course, it must be acknowledged that no rotational system can have "perfect" static balance, but that adequate or optimal static balance can be achieved in real-world rotational systems such as tire/wheel assemblies and aircraft propellers and the high-rotational-speed components of gas turbine and steam turbine engines. One precise way to describe and define ideal static balance is to say that a rotating system is in static balance if all of the centrifugal force vectors (which act perpendicularly to the axis of rotation) have a sum that is zero.

In contrast to static imbalance, couple imbalance can, for all practical purposes, be detected only during rotational motion and therefore requires dynamic balancing machines. That is, a rotational system such as a tire/wheel assembly can appear to have perfect static balance, and yet, during rotation, vibrations associated with imbalance forces will arise, due to couple imbalance.

A dynamic balancing machine can be used to detect and correct both couple imbalance and static imbalance, and therefore a tire/wheel assembly that is characterized as "dynamically balanced" is generally understood to be both statically and couple balanced. The definition given above for static balance—namely, that all of the centrifugal force vectors have a sum that is zero—can be supplemented to provide a corresponding definition of dynamic balance: i.e., dynamic balance of a rotational system exists when the sum of all the centrifugal force vectors is zero (static balance), and the sum of the moments of these centrifugal force vectors about any axis that is perpendicular to the axis of rotation is zero (couple balance).

One example of a statically balanced but dynamically unbalanced tire/wheel assembly would be one in which one sidewall of a tire is non-uniform in such a way that some angular portion of the sidewall is either lighter or heavier than the other portions of the sidewall while, at the same time, the other sidewall has exactly the same mass-distribution properties but is oriented about the axis of rotation in such a way that the respective non-uniformities of each sidewall are oriented angularly apart from one another with respect to the tire/wheel's axis of rotation. In such a tire/wheel assembly, the centrifugal force vectors would thus have a non-zero resulting moment and would tend to rotate the tire about an axis that is perpendicular to both the axis of rotation and the direction of these centrifugal force vectors. However, with regard to static balance, the centrifugal force vectors for such a tire as a whole could have a sum that is zero if the locations of excess mass associated with the respective sidewalls in the above example are located angularly apart from one another. For example, if two equal excess masses "M" are located one at a point in each sidewall, then dynamic imbalance with static balance (i.e. pure couple imbalance) will occur if mass M in the first sidewall is located 180 degrees around from mass M in the second sidewall, and both masses M are located at the same radius. (In the irregular sidewall example given above for dynamic imbalance, if only one of the sidewalls is unbalanced, the tire/wheel assembly will have both a static and a couple imbalance.)

Other Non-Uniformities

In addition to static and couple mass imbalances, rotational vibrations can arise from other non-uniformities in tire/wheel assemblies. For example, a tire might have a tread or sidewall(s) that has greater or lesser flexibility (stiffness) within one angular portion compared to other portions of the tread or sidewalls. Such a tire/wheel assembly might have "perfect," i.e., as close to perfect as is practical, couple and static balance, but when it is operated upon a vehicle, the portion of the tread or sidewall that is either softer or stiffer will interact with the road surface in ways that will give rise to vibrations comparable to (similar in some regards, but somewhat more complex than) those of a tire/wheel assembly that is unbalanced.

For example, if a portion of the tread is more or less flexible than the other portions of the tread, and the tire is otherwise uniform in its properties across its lateral dimension, a resulting vibration may be comparable to that arising from a static imbalance. Or, if the stiffness properties of the tire are not uniform from side to side and along the tire circumference, then the resultant rotational vibrations might mimic the effects of a couple imbalance.

Similarly, tires with radial or lateral runout will interact with the road surface in ways that will give rise to vibrations comparable to those of a tire/wheel assembly that is unbalanced, statically or dynamically.

BRIEF SUMMARY OF THE INVENTION

It is an object of the present invention to provide methods of improving vehicle steering performance and steering performance robustness (reducing the risk of steering performance loss), as defined in one or more of the appended claims.

According to the invention, a method of improving steering performance robustness in a vehicle having a plurality of tire/wheel assemblies, including a number of front tire/wheel assemblies and a number of rear tire/wheel assemblies, each tire/wheel assembly comprising a tire mounted on a wheel, comprises imparting a controlled amount of stiffness non-uniformity to the tire in at least one of the tire/wheel assemblies, preferably one or more of the front tire/wheel assemblies. The stiffness non-uniformity in the tire of the at least one tire/wheel assembly can be advantageously combined with a mass non-uniformity and/or with a dimensional non-uniformity in the at least one tire/wheel assembly. Preferably all of the plurality of tire/wheel assemblies are statically and dynamically balanced.

According to the method of the invention, the stiffness non-uniformity is imparted meridionally symmetrically about the equatorial plane of the tire, and the tire with the stiffness non-uniformity is corrected to assure minimum lateral force variation.

In an embodiment of the inventive method, the stiffness non-uniformity is a tire sector having at least one heavy splice; for example, splices of different tire components (layers) are positioned in the same sector of the tire, and/or have increased widths of the splice overlap area. The width W of each heavy splice sector can be increased, both to increase a localized excess mass, and also to circumferentially lengthen a localized excess stiffness portion of the tire, thereby increasing both mass non-uniformity and stiffness non-uniformity.

In another embodiment of the inventive method, the stiffness non-uniformity is at least one extra fabric piece applied to the tire (i.e., attached to a surface, or inserted within or between layers of the tire). The fabric width W' and the fabric material are selected to provide a desired amount of both mass and stiffness non-uniformities.

In another embodiment of the inventive method, the stiffness non-uniformity is imparted with at least one sector of a tire component (e.g., tread rubber, belts, plies, etc.) having a different stiffness than the remainder of the tire component. For example, at least one sector of an apex above each bead can have a different stiffness, thereby causing a beneficial stiffness non-uniformity in sidewalls of the tire. For example, the different stiffness can be imparted in at least one sector of a tire tread having a pattern by varying the tread pattern.

According to the invention, a method of improving steering performance robustness in a vehicle having a plurality of tire/wheel assemblies, including a number of front tire/wheel assemblies and a number of rear tire/wheel assemblies, each tire/wheel assembly comprising a tire mounted on a wheel, comprises: imparting a controlled amount of radial force variation and/or tangential force variation to at least one of the tire/wheel assemblies by means of any combination of changes to the mass non-uniformity, dimensional non-uniformity, and stiffness non-uniformity of the at least one tire/wheel assembly; and minimizing lateral force variation in the at least one tire/wheel assembly. Preferably the at least one tire/wheel assembly is selected from one or more of the front tire/wheel assemblies. Preferably all of the plurality of tire/wheel assemblies are statically and dynamically balanced.

According to the method of the invention, the combination of changes to the mass non-uniformity, dimensional non-uniformity, and stiffness non-uniformity is made to the tire of the at least one tire/wheel assembly. Alternatively, the combination of changes to the mass non-uniformity, dimensional non-uniformity, and stiffness non-uniformity is made to the wheel of the at least one tire/wheel assembly.

The invention relates to methods for improving vehicle steering performance and robustness of that performance through control of non-uniformities in the vehicle's tires, wheels and tire/wheel assemblies as a way to overcome the tendency of the steering systems in certain vehicle types to undergo "steering performance loss." While minimizing lateral force variations (e.g., couple imbalance), a controlled amount of radial and/or tangential force variation is induced in one or more tire/wheel assemblies by imparting mass non-uniformity, dimensional non-uniformity, and/or stiffness non-uniformity. For stiffness non-uniformity, the preferred method is imparting a controlled amount of stiffness non-uniformity to the tire in at least one of the tire/wheel assemblies, followed by statically and dynamically balancing all of the vehicle's tire/wheel assemblies. The stiffness non-uniformity is one or more sectors of the tire having a different (preferably more) stiffness than the remainder of the tire. All tire non-uniformities imparted according to the invention are preferably distributed meridionally symmetrically about the equatorial plane of the tire, so as to induce tangential and/or radial force variations but not lateral force variations. Beneficial tangential and/or radial force variations will result from the operation of such a tire, even if the tire/wheel assembly is balanced by weights added to the wheel. The stiffness non-uniformity is preferably imparted in the tire by one or more heavy splices, and/or extra pieces of fabric applied to the carcass or tread, and/or sectors of tire components having different stiffness. Synergistic beneficial effects result from combinations of the various forms of beneficial mass, stiffness, and dimensional non-uniformity.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements 199 may be referred to individually as 199a, 199b, 199c, etc. Or related but modified elements may have the same number but are distinguished by primes. For example, 109, 109', and 109" are three different elements which are similar or related in some way, but have significant modifications e.g., a tire 109 having a static imbalance versus a different tire 109' of the same tire construction, but having a couple imbalance. Such relationships, if any, between similar elements in the same or different figures will become apparent throughout the specification, including, if applicable, in the claims and abstract.

Figures 1A, 1B, 1C:
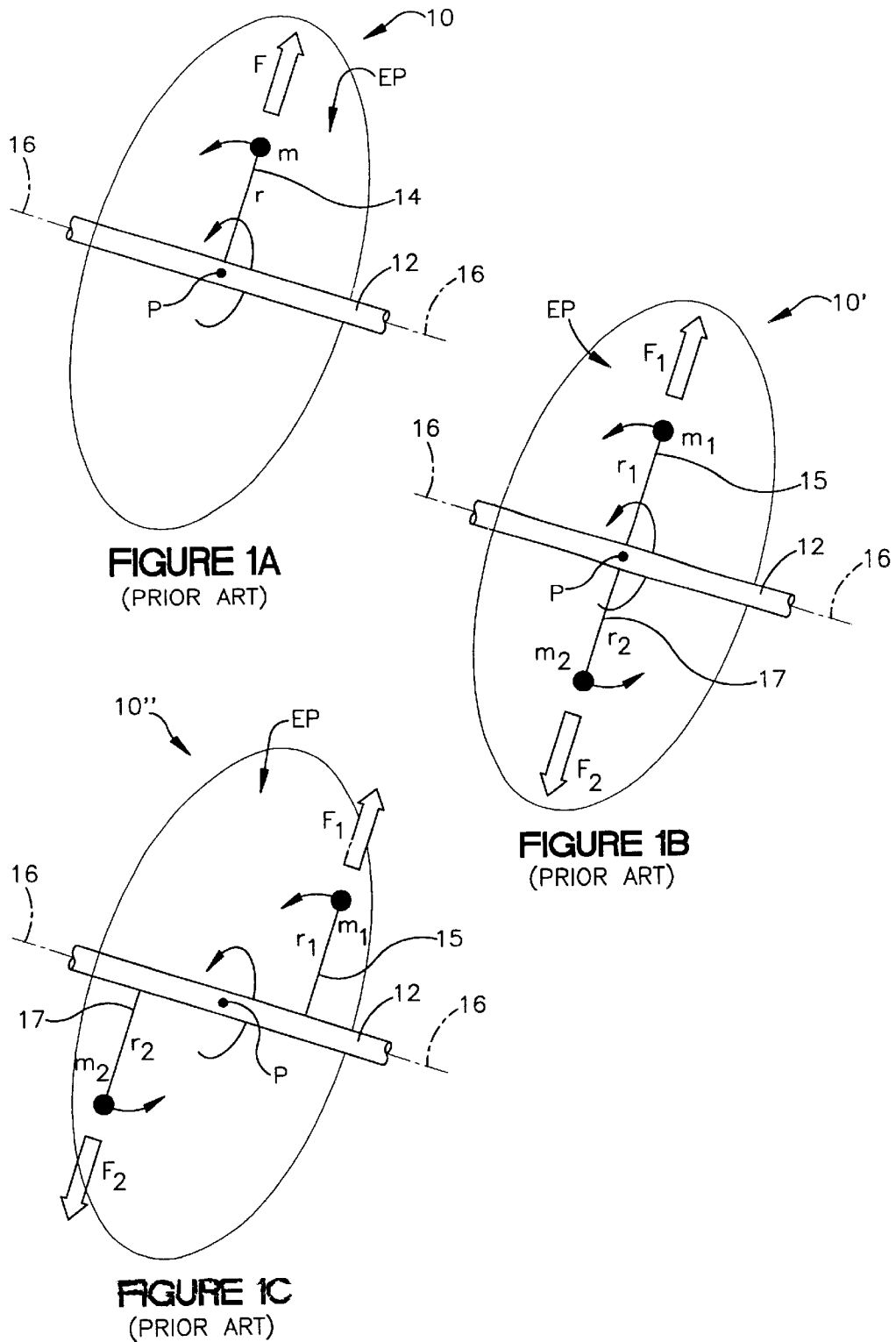
Figure 1D:
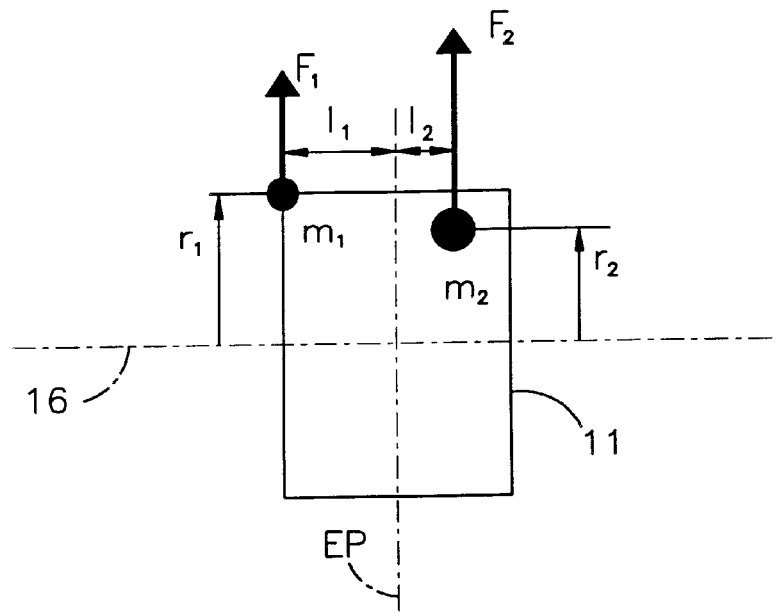
Figure 1E:
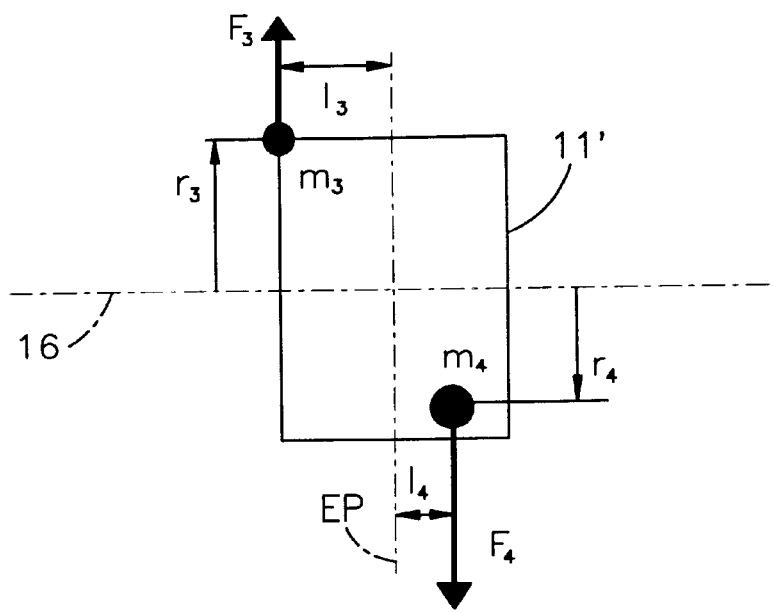
Figure 5A:
Figure 5B:
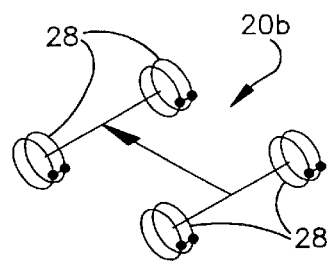
Figure 5C:
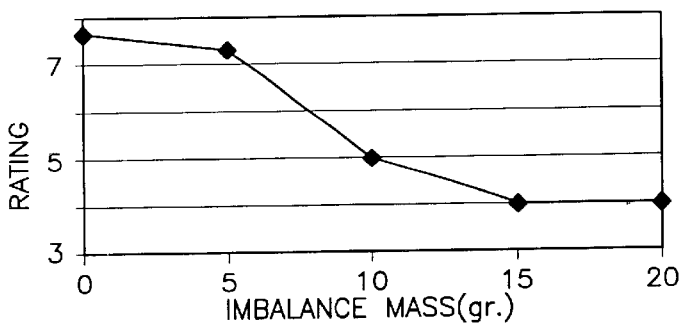
Figure 5D:
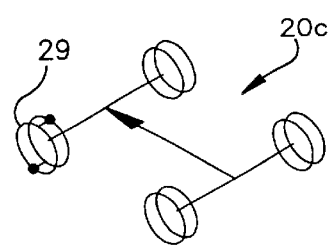
Figure 6A:
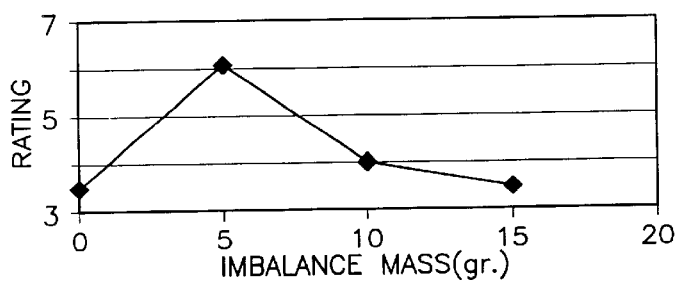
Figure 6B:
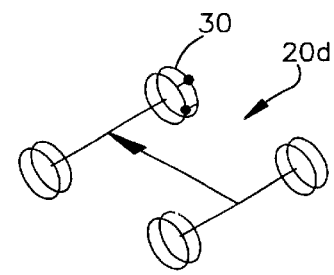
Figure 6C:
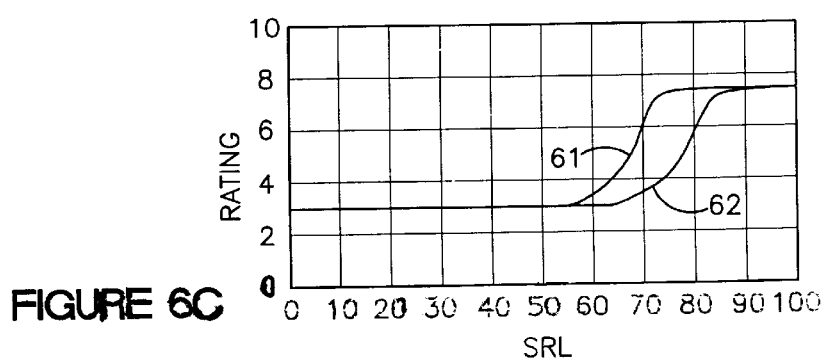
Figure 6D:
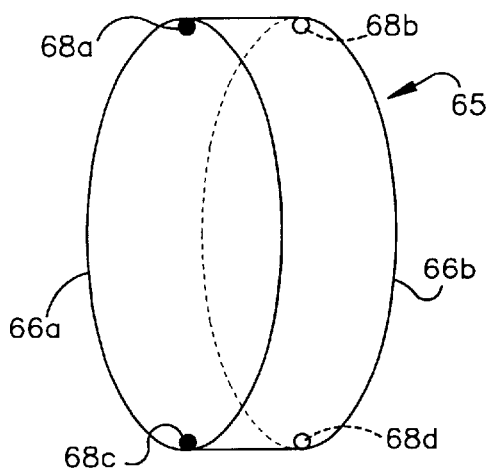
Figure 6E:
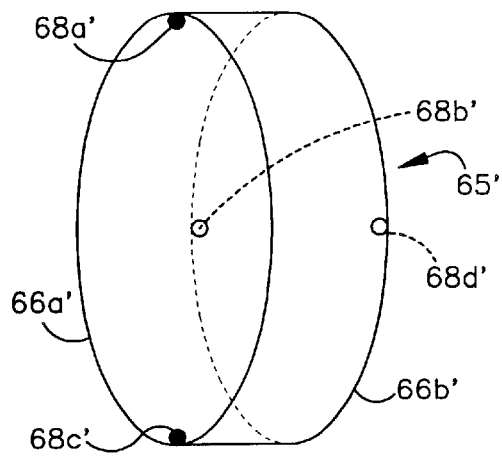
Figure 7A:
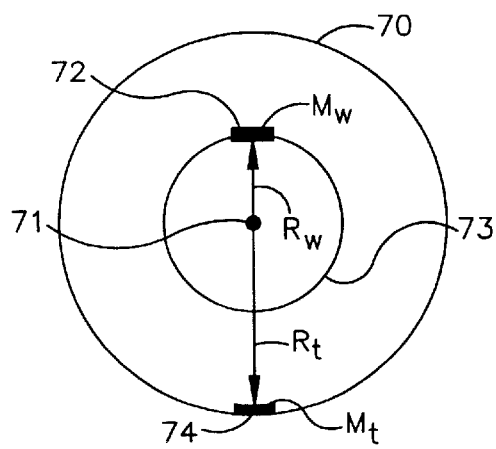
Figure 7B:
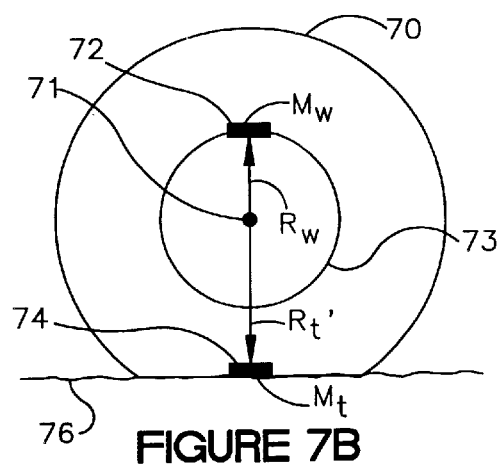
Figure 7C:
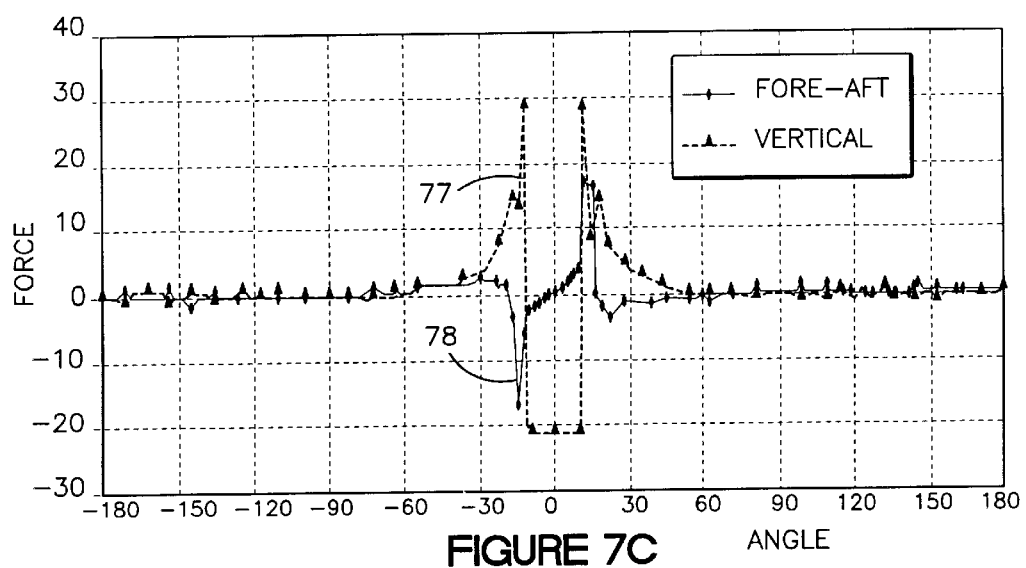
Figure 7D:
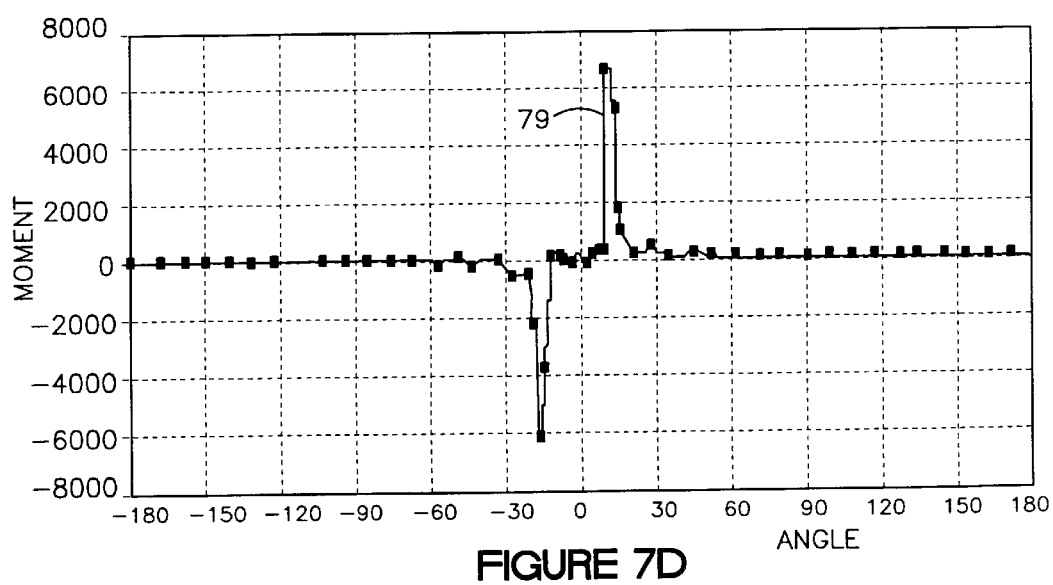
Figure 8A:
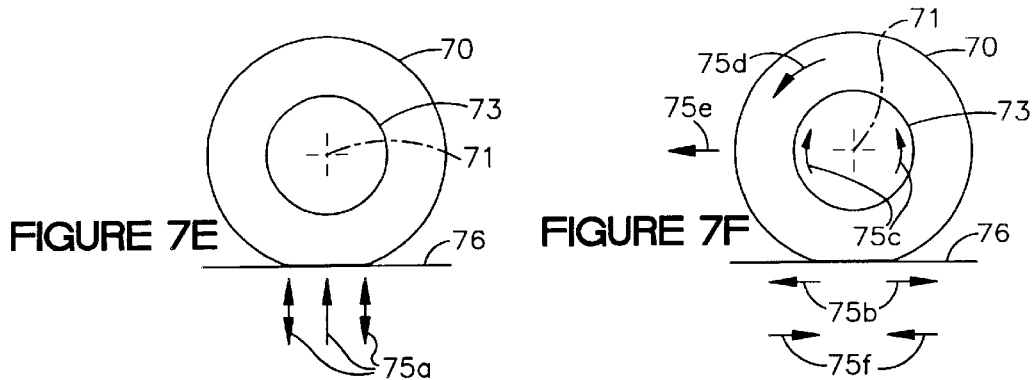
Figure 8A:
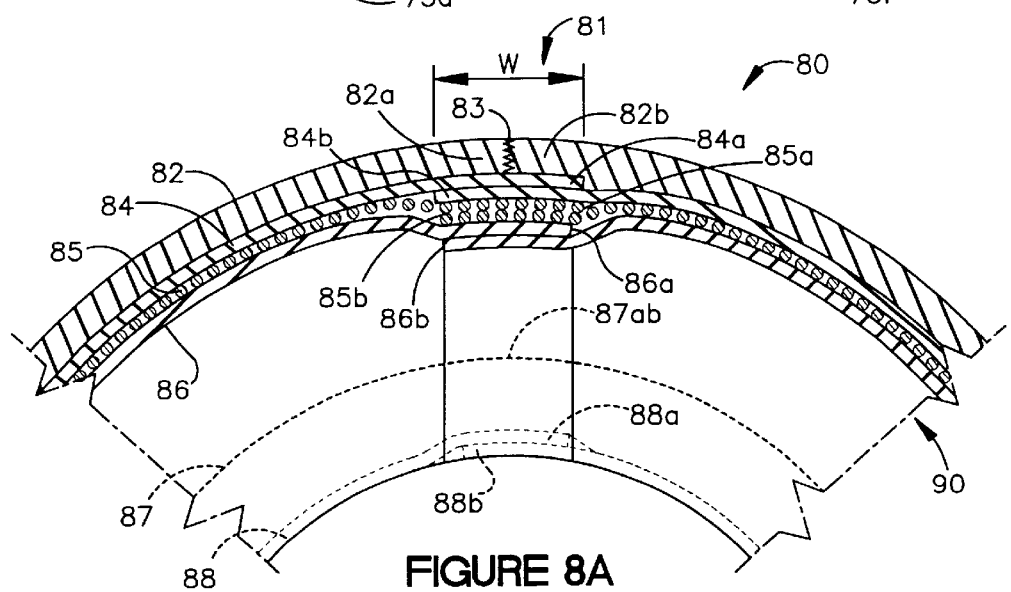
Figure 8B:
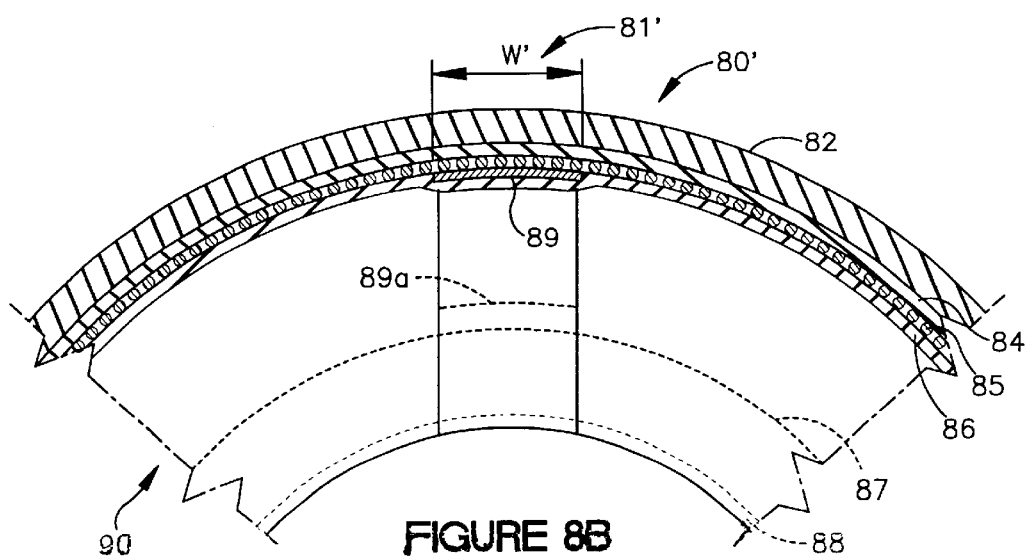

The structure, operation, and advantages of the present preferred embodiment of the invention will become further apparent upon consideration of the following description taken in conjunction with the accompanying drawings, wherein:

FIG. 1A is a schematic diagram of a rotating system having static imbalance, according to the prior art;

FIG. 1B is a schematic diagram of a dynamically balanced rotating system (static and couple balance), according to the prior art;

FIG. 1C is a schematic diagram of a rotating system with couple imbalance, according to the prior art;

FIG. 1D is a cross sectional schematic view of a wheel having pure static imbalance without any couple imbalance, according to the prior art;

FIG. 1E is a cross sectional schematic view of a wheel having pure couple imbalance without any static imbalance, according to the prior art;

FIG. 2A is a schematic diagram illustrating a circular motion that is induced by a static imbalance about the rotational axis of a rotating system, according to the prior art;

FIG. 2B is a schematic diagram illustrating a motion that is induced by a couple imbalance about the rotational axis of a rotating system, according to the prior art;

FIG. 3A is a graph illustrating a subjective rating of steering performance of a vehicle as a function of the use of a single, rear-mounted tire/wheel assembly having a residual static imbalance, according to the invention;

FIG. 3B is a schematic diagram showing the location of a single statically unbalanced rear tire/wheel assembly, according to the invention;

FIG. 4A is a graph illustrating a subjective rating of steering performance of a vehicle as a function of the use of a single, front-mounted tire/wheel assembly having a residual static imbalance, according to the invention;

FIG. 4B is a schematic diagram showing the location of a single statically unbalanced front tire/wheel assembly, according to the invention;

FIG. 5A is a graph illustrating a subjective rating of steering performance of a vehicle as a function of the use of four tire/wheel assemblies, each of which has a residual static imbalance, according to the invention;

FIG. 5B is a schematic diagram showing the locations of four statically unbalanced tire/wheel assemblies, according to the invention;

FIG. 5C is a graph illustrating a subjective rating of steering performance of a vehicle as a function of the use of a single, front-mounted tire/wheel assembly having a couple imbalance, according to the invention;

FIG. 5D is a schematic diagram showing the location of a single couple-unbalanced front tire/wheel assembly, according to the invention;

FIG. 6A is a graph illustrating a subjective rating of steering performance of a vehicle as a function of the use of a single, front-mounted tire/wheel assembly having a mixed static and couple imbalance, according to the invention;

FIG. 6B is a schematic diagram showing the location of a front-mounted tire/wheel assembly with a mixed static and couple imbalance, according to the invention;

FIG. 6C is a graph illustrating a subjective rating of steering performance for two different tire constructions tested on a vehicle as a function of the Steering Robustness Level (SRL), according to the invention;

FIG. 6D is a schematic illustration of a tire with a symmetric second order mass non-uniformity configuration, according to the invention;

FIG. 6E is a schematic illustration of a tire with an asymmetric second order mass non-uniformity configuration, according to the invention;

FIG. 7A is a schematic diagram of a tire/wheel assembly with a mass non-uniformity and a balance weight, according to an embodiment of the invention;

FIG. 7B is the tire/wheel assembly of FIG. 7A shown rolling on a road surface, according to the invention;

FIG. 7C is a graph illustrating predicted vertical and fore-aft forces caused at the axis of rotation by the mass non-uniformities of the tire/wheel assembly of FIG. 7B, according to the invention;

FIG. 7D is a graph illustrating fore-aft moments associated with the fore-aft forces illustrated in FIG. 7C, according to the invention;

FIG. 7E is a schematic diagram of the tire/wheel assembly of FIG. 7B illustrating vertical force vectors corresponding to vertical force peaks illustrated in FIG. 7C, according to the invention;

FIG. 7F is a schematic diagram of the tire/wheel assembly of FIG. 7B illustrating fore-aft force vectors corresponding to fore-aft force peaks illustrated in FIG. 7C, and moment vectors corresponding to moment peaks illustrated in FIG. 7D, according to the invention;

FIG. 8A is a circumferential cross section of a sector of a tire illustrating splice methods for incorporating non-uniformities, according to the invention; and FIG. 8B is a circumferential cross section of a sector of a tire illustrating fabric methods for incorporating non-uniformities, according to the invention.

DETAILED DESCRIPTION OF THE INVENTION

Definitions

The following terms may be used throughout the descriptions presented herein and should generally be given the following meaning unless contradicted or elaborated upon by other descriptions set forth herein.

"Axial" refers to a direction parallel to the axis of rotation of the tire.

"Balance" refers to a distribution of mass around a tire or tire/wheel assembly.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Conicity" is an average lateral force resulting from, for example, a conical shaped tire. In general, conicity is a non-uniformity resulting from a dimensional, stiffness or mass property that is distributed asymmetrically along a tire's meridional contour, thereby causing a lateral (i.e. steering) force in a constant lateral direction, independent of the direction of tire rotation. It can be caused, for example, by off-center tire components.

"Couple Imbalance" refers to an imbalance that tends to rotate the tire about an axis that is perpendicular to the axis of rotation, thereby generally resulting in tire/wheel assembly wobble.

"Dimensional non-uniformities" refers to non-uniformities in tire dimensions wherein the non-uniformities are measurable when the tire is at rest.

"Dynamic Balancing" refers to a method of balancing a tire/wheel assembly while rotating the assembly.

"Dynamic non-uniformities" refers to non-uniformities that are manifested when the tire is rotating.

"Equatorial plane" refers to a plane perpendicular to the tire's axis of rotation and passing through the center of its tread, or to a plane containing the circumferential centerline of the tread.

"Footprint" refers to a contact patch or area of contact of a tire tread with a flat surface (the ground, a road) under normal load and pressure. Footprints can change with speed.

"Hop" refers to a vertical oscillatory motion of a wheel between the road surface and the spring mass.

"Inflation" refers to the tire cold inflation pressure required for specific loads and speed conditions.

"Imbalance" (equivalently "unbalance") refers to a condition which is not balanced.

"Lateral" refers to a direction parallel to the axial direction, and usually refers to forces acting on the tire tread in a lateral (axial) direction.

"Lateral force variation" is a dynamic non-uniformity referring to the tire's lateral (axial) force being non-uniform around its circumference, thereby causing lateral vibration (e.g., wobbling) during driving. It is typically generated by a non-uniform dimensional, stiffness or mass distribution both along the meridional contour and along the tire circumference.

"Meridian" and "Meridional" refer to a tire cross-section cut along a plane that includes the tire axis.

"Offset" refers to the lateral distance from the center of a rim (midway between the flanges) to the wheel-mounting surface of the rim.

"On-center feel" refers to the subjective feeling of the absence or presence of free play in a vehicle's steering wheel before noticeable steering response occurs.

"Oversteer" refers to a condition where the rear tires have a greater slip angle than the front tires, causing the vehicle to turn in a smaller radius than desired by the driver.

"Parallel hop" refers to a form of wheel hop in which a pair of wheels hop in phase with one another.

"Pneumatic tire" is a laminated mechanical device of generally toroidal shape (usually an open-torus) having two beads, two sidewalls and a tread and made of rubber, chemicals, fabric and steel or other materials, and typically inflated with air under pressure.

"Radial force variation" is a dynamic non-uniformity referring to the tire's radial force being non-uniform around the tire's circumference, thereby causing vertical and fore-aft vibration during driving. It is typically generated by a non-uniform dimensional, stiffness or mass distribution along the tire's circumference.

"Radial runout" is a dimensional dynamic non-uniformity representing a variation in tire radius around the circumference of a rotating tire.

"Residual Static Imbalance" or RSI refers to the intentional introduction of a static imbalance in a tire or tire/wheel assembly, wherein the RSI is of adequate magnitude to have beneficial influences upon steering performance, by generating fore-aft and/or vertical force variations at the wheel axis, without at the same time being of sufficient magnitude to be noticeable to the vehicle's occupants as vibrations.

"Runout" refers to a variation in the reading of a rotating object dimensional indicator. It generally refers to the difference between maximum and minimum readings (peak to peak), as applied to:

a. Radial wheel runout—The difference between the maximum and minimum measurements of the wheel bead seat radii measured perpendicular to the spin axis. Values can be different for each side (flange).

b. Lateral wheel runout—The difference between the maximum and minimum measurements parallel to the axis of rotation on the inside vertical portion of a rim flange. Values can be different for each side (flange).

c. Radial tire runout—The difference between the maximum and minimum measurements on the tread surface and in a plane perpendicular to the axis of rotation while the tire is mounted on a true running wheel. The runout value can depend on the axial location of the measuring point on the tread surface.

d. Lateral tire runout—The difference between the maximum and minimum measurements parallel to the axis of rotation at a given point of the tire surface (e.g. at the widest point of each sidewall, exclusive of decoration), while the tire is mounted on a true running wheel.

e. Radial runout skewness—Can be applied to wheels or tires and refers to radial runouts of the two sides (wheel flanges or tire shoulders) that are out of phase or asymmetric about the equatorial plane.

"Shimmy" refers to a rapid sidewise (lateral) vibration of the front wheels, and can be caused by worn kingpins or other parts of a vehicle's steering mechanism, as well as by tires with couple imbalance.

"Sidewall" refers to that portion of a tire between the tread and the bead.

"Slip Angle" refers to an angle between the vehicle's direction of travel and the direction in which the front wheels are pointing.

"Static Imbalance" refers to a condition such that when a tire/wheel assembly is turned on a horizontal, very low friction, free axle, it will always come to rest (become static) at a given rotational position.

"Steering Robustness" refers to the ability of a tire/wheel/vehicle system to maintain a high steering performance, despite unfavorable and/or variable test conditions. A "Steering Robustness Level" (SRL) is the concept used to describe and measure the steering robustness.

"Steering Robustness Level" or SRL refers to a combination (additive function) of all the positive and negative contributions to steering performance (static imbalance, couple imbalance and all other relevant factors). A split can be made between "intrinsic" and "extrinsic" contributions to SRL to cover for example, intrinsic contributions related to tire characteristics, including built-in non-uniformities, and extrinsic contributions related to vehicle/road/test conditions, test condition variations, tire manufacturing variations, etc.

"Tangential force variation" refers to the nonuniform rotation of the tire's outer surface relative to the rotation of the tire's bead area. It produces a fore-aft or "push-pull" force variation which is generated at the surface of contact between tire and road surface in a direction both tangential to the tire tread and perpendicular to the tire axis of rotation.

"Tire Balancing" refers to adding external weights around a tire/wheel assembly to compensate for static and/or couple imbalance of the tire and wheel as an assembled unit.

"Traction" refers to the friction force between a tire and a surface on which it is moving.

"Tramp" refers to a form of wheel hop in which a pair of wheels hop in opposite phase.

"True Running Wheel" (or "True Wheel") refers to a wheel which rotates ("runs") without exhibiting any forms of runout or imbalance.

"Understeer" refers to a condition where the front tires have a larger slip-angle than the rear tires, making the vehicle tend to turn less sharply than the wheels are pointed. The vehicle must be held into the turn.

"Uniformity" refers to a measure of the ability of a tire or a wheel to run smoothly and vibration free. Typically measured with a tire uniformity machine. Measurements include, for example, radial/lateral/tangential force variation, radial/lateral runout, and static/couple balance.

"Wheel" refers to a generally cylindrical, typically metallic, disc-like mechanical support for supporting a typically pneumatic tire and mounting to a vehicle axle. A wheel has two axially spaced-apart flanges (or annular lips), each flange adapted to securely receive a respective one of the two beads of the mounted tire.

"Wheel Alignment" refers to an adjustment of wheel position to ensure proper orientation of wheels (and tires) to the vehicle chassis and to each other.

"Wheel Balance Weight" refers to a small weight mounted (clamped or adhered) to a wheel (often to an outside portion of a flange of the wheel) to correct an unbalanced tire and/or wheel condition.

"Wheel Geometry" refers to an axis about which a wheel assembly rotates. Conditions such as bent wheels, worn bushings and improper alignment affect wheel geometry.

"Wobbling moment variation" refers to a variation in the moments about a fore-aft horizontal axis (camber or overturning moment) or about a vertical axis (steer or self-aligning moment) and, as lateral force variation, is generated by a non-uniform dimensional, stiffness or mass distribution both along the meridional contour and along the tire circumference.

Introduction

While researching the effects of tire and wheel characteristics on steering performance, the inventors have determined that, contrary to assumptions of the prior art, certain types and magnitudes of tire/wheel vibration can have an ameliorating effect on steering performance and steering performance robustness, and can therefore avoid the steering performance loss (SP-Loss) problem described in the background hereinabove. The invention therefore concerns application of this discovery as methods for improving steering performance robustness, i.e., long-term prevention of SP-Loss.

Many vehicles have a tendency to undergo steering performance loss. This tendency depends, for example, on the design and condition of the vehicle, the road and driving conditions, as well as the tire/wheel characteristics. SP-Loss may manifest itself in the following possible ways: performance variations in steering precision and on-center feel while driving (the less severe case), a sudden performance drop in steering precision and on-center feel while driving (the most obvious case to detect), or a poor performance in steering precision and on-center feel right from the test start (the most severe case). When SP-Loss sets in, the vehicle response seems not properly in phase with torque feedback from the steering wheel. Our research indicates that SP-Loss does not seem to be related to changes in tire force and moment characteristics, but rather seems to arise within the vehicle's steering system and linkages that connect the driver's steering wheel to the tires and wheels that actually steer the vehicle.

As will be described in more detail hereinbelow, it has been determined that tire/wheel vibrations due to lateral force variations (LFV, e.g., couple imbalance) generally have a detrimental effect on steering performance and steering performance robustness, can easily lead to SP-Loss, and therefore should be minimized if not eliminated. On the other hand, vibrations due to radial force variations (RFV) and/or tangential force variations (TFV) caused, for example, by static imbalance or by mass non-uniformities concentrated in the tread area (including tread rubber, belts and carcass layers underlying it) and positioned symmetrically about the equatorial plane may have a beneficial effect on steering performance and steering performance robustness, and these beneficial effects can be obtained even when the radial/tangential force variations are at a low enough magnitude so as to be un-noticeable by the vehicle's driver or occupants, and also have a negligible impact on tire wear.

Various theories have been proposed to explain how certain vibrations could trigger or prevent SP-Loss. Also, the causes of steering performance loss are theoretical and manifold. Of most immediate interest are the theoretical effects of static vs. couple imbalance of tire/wheel assemblies, or more generally, the effects of RFV/TFV versus LFV. The general characteristics of each type of imbalance/non-uniformity can be differentiated from one another in one particular respect that has at least a superficial plausible relationship to the steering performance loss problem: RFV/TFV (e.g., pure static imbalance) gives rise to vibrations that act upon the tire's axis of rotation in a way that applies forces that are more or less perpendicular to the axis of the tire/wheel assembly, while LFV (e.g., couple imbalance) produces vibrations that tend to force the axis of rotation to rotate about a point on the axis near where it intersects the tire's equatorial plane. Due to the design of the vehicles and of their components (steering system, suspension system, brake system, etc.), it is plausible that lateral hub vibrations will propagate differently and have different effects than radial or fore-aft vibrations. On the other hand, vibrations are known to affect the friction and stick/slip behavior at the interface between involved components: a dynamic friction is, for example, lower than a static friction. Friction changes in a complex system such as a steering system, taken as a whole, will logically affect the reactivity of that system and the subjective perception of its reactions.

Tangential, radial, and lateral force variations in rotating tire/wheel assemblies are known to have a wide variety of causes. The most obvious cause, and also the simplest to vary in a controlled way for research testing, is imbalance of the tire/wheel assembly. Adding balance weights to wheel rims is a well-known method for "balancing" a tire/wheel assembly, thereby canceling out a part of the radial and lateral force variations, to the extent that they can be measured by existing tire balancing equipment, in non-loaded spinning conditions. (As will be discussed in more detail hereinbelow, this method generally can not fully compensate for the effect of all tire characteristics, such as abrupt force and moment peaks caused by localized tire non-uniformities.) Thus the concepts underlying the methods of the present invention for improving steering performance robustness will first be developed using the simplified concepts involving tire/wheel balance.

Static And Couple Imbalances

In the theoretical, "perfectly" balanced rotating system, the centrifugal force vectors, which act perpendicularly to the axis of rotation, have a sum that is zero. Such perfection (in most any endeavor) can be approached, but is typically never achieved.

FIG. 1A shows a rotating system 10 comprising a rotating shaft 12 to which is attached a mass m at the end of an arm 14 having a length r which is also taken, in FIG. 1A, as the radial distance of the center of mass m from the axis of rotation 16 of the shaft 12. The plane EP is the equatorial plane within which the mass m revolves in a circular trajectory having a radius r. (The equatorial plane EP is shown as having a circular outer limit purely for purposes of illustrating that the plane exists.) The point P represents a point whereat the axis of rotation 16 intersects the equatorial plane EP. The mass m exerts a radially outward-directed centrifugal force vector F whose magnitude, from Newton's Second Law of Motion, is the multiplicative product of m and r and the square of the shaft's rotational speed (in units of radians per second). Such a rotational system has an obvious imbalance.

Assuming, in reference to FIG. 1A, that the equatorial plane EP represents the equatorial plane of a tire/wheel assembly, then the location of the mass m within the equatorial plane would result in a static imbalance of the system shown, but would not result in a couple imbalance. By contrast, were the mass m to be located outside of the equatorial plane EP, i.e., to either side of the equatorial plane, the imbalance would be of both the static and the couple types. This will become more evident upon examination of the FIGS. 1B and 1C.

FIG. 1B shows a rotating system 10' having two masses, $m_1$ and $m_2$ at the ends of arms 15 and 17, having respective lengths $r_1$ and $r_2$. The two masses $m_1$ and $m_2$ and their respective arms 15 and 17 are shown to be disposed in radial opposition to one another about the rotational (spin) axis 16 and to be within the equatorial plane EP. During rotation of the shaft 12, the respective centrifugal force vectors $F_1$ and $F_2$ will be oppositely directed from one another. If $F_1$ and $F_2$ are of equal magnitude, then the rotating system shown in FIG. 1B will be in perfect dynamic balance (i.e., both static balance and couple balance). Note that even if $F_1$ and $F_2$ are equal, the respective masses, $m_1$ and $m_2$ and their respective distances, $r_1$ and $r_2$, from the axis of rotation 16 need not be respectively equal to one another. Note further that if the two masses $m_1$ and $m_2$ and their respective arms 15 and 17 are moved outside of the equatorial plane EP, static balance will be maintained, even if the two masses are not maintained in the same plane, as long as they are 180 degrees apart around the rotational axis 16. In other words, static balance will be achieved and maintained as long as all centrifugal force vectors, acting perpendicularly to the axis of rotation, have a sum that is substantially zero.

In the rotating system 10" shown in FIG. 1C, the same two masses $m_1$ and $m_2$ are shown disposed opposite one another, as in FIG. 1B, but in separate respective planes, e.g. on opposite sides of the equatorial plane EP. For the purpose of the remainder of this description of couple imbalance, it is important to know that the plane in which $m_1$ is revolving about the axis 16 needs not be equally far from the equatorial plane EP as the plane in which $m_2$ is rotating. However, for the sake of simplicity in this discussion, the assumption of equal distances of the equatorial plane EP from the respective planes of rotation of the respective masses might be useful. The rotating system shown in FIG. 1C will exhibit couple imbalance, even if the respective centrifugal forces $F_1$ and $F_2$ are of equal magnitude (in which case the system will have static balance). If the forces $F_1$ and $F_2$ have different magnitudes, then the rotating system 10" shown in FIG. 1C will have both static and couple imbalances.

With continued reference to FIG. 1C, one having ordinary skill in the art to which the present invention most nearly pertains will recognize that the respective forces $F_1$ and $F_2$ each will produce a torsional moment with respect to the point P, and the torsional moment(s) will cause the axis to tend to rotate in a complex pattern described more fully below.

FIGS. 1D and 1E illustrate tire/wheel assembly balancing cases where, for example, due to wheel design, two balance weights are not or cannot be located at the same axial distance from the equatorial plane and/or at the same radial distance from the axis of rotation, thereby forcing a geometrical asymmetry. In these cases, pure static imbalance or pure couple imbalance can still be achieved, providing the two balance weights have a different mass, in such a way that the geometrical asymmetry is compensated for. FIG. 1D illustrates a cross sectional schematic view of a wheel 11 which rotates about an axis of rotation 16, and has an equatorial plane EP. A pure static imbalance without couple imbalance, can be achieved for the wheel 11 (and a tire, not shown, mounted on it) by installing, at substantially the same rotational angle about the axis of rotation 16, two balance weights $m_1$ and $m_2$ having different masses such that their mass ratio $m_1/m_2$ is substantially inversely proportional to the ratio $l_1/l_2$ of their respective axial distances $l_1$ and $l_2$ from the equatorial plane EP, and also inversely proportional to the ratio $r_1/r_2$ of their respective radial distances $r_1$ and $r_2$ from the axis of rotation 16. Expressed as an equation: $m_1/m_2=(l_2/l_1)*(r_2/r_1)$. Given these conditions, respective resultant centrifugal force vectors $F_1$ and $F_2$ will be substantially inversely proportional to the ratio of their respective distances from the axis of rotation ($F_1/F_2=l_2/l_1$), and therefore the resulting moment (e.g., $F_1*l_1-F_2*l_2$) about any axis that is perpendicular to the axis of rotation will substantially be zero (couple balance).

FIG. 1E illustrates a cross sectional schematic view of a wheel 11' which rotates about an axis of rotation 16, and has an equatorial plane EP. In contrast with the wheel 11 of FIG. 1D, a pure couple imbalance without static imbalance, can be achieved for the wheel 11' (and a tire, not shown, mounted on it) by installing, 180 degrees apart about the axis of rotation 16, two balance weights $m_3$ and $m_4$ having different masses such that their mass ratio $m_3/m_4$ is substantially inversely proportional to the ratio $r_3/r_4$ of their respective radial distances $r_3$ and $r_4$ from the axis of rotation 16. Expressed as an equation: $m_3/m_4=r_4/r_3$. Given these conditions, respective resultant centrifugal force vectors $F_3$ and $F_4$ will be substantially equal and in opposite directions, which guarantees a perfect static balance, but, due their axial offsets, $l_3$ and $l_4$, respectively, will create a non-zero resulting moment (e.g., $F_3*l_3+F_4*l_4$) about an axis that is perpendicular to the axis of rotation 16 (wobbling moment).

Referring to FIG. 2A, there is shown an axis of rotation 16 passing through a point P which, as in the preceding FIGS. 1A, 1B and 1C, lies in the equatorial plane EP (which is not shown in FIGS. 2A and 2B) of a tire/wheel assembly. The axis 16 is the ideal axis of rotation of a perfectly balanced rotating system. FIG. 2A demonstrates the effect of a pure static imbalance (mass not shown) upon the rotational axis 16. Specifically, a pure static imbalance will produce forces that will tend to cause an orbiting movement of the axis 16, as shown by the dashed line 16a, which tends toward a circular motion about the ideal axis of rotation 16. The circular motion of the orbiting axis 16a is shown by the arrows 18. FIG. 2A illustrates an idealized representation of the effect of a pure static imbalance upon the axis of rotation 16 of rotating systems 10, 10' of the types shown in FIGS. 1A and 1B, respectively.

Referring to FIG. 2B, there is shown an ideal axis of rotation 16 passing through a point P which, as in the preceding FIGS. 1A, 1B and 1C, lies in the equatorial plane EP (which is not shown in FIGS. 2A and 2B) of a tire/wheel assembly. FIG. 2B demonstrates the effect of a pure couple imbalance (masses not shown) upon the rotational axis 16. Specifically, a pure couple imbalance will produce torques that will tend to cause a nutating (wobbling) movement of the axis 16, as shown by the dashed line 16b, which will have a tendency toward a wobbling motion about the point P. The motion of the wobbling axis 16b is shown by the two oppositely oriented arrows 19 and 21. FIG. 2B is an idealized representation of the effect of a pure couple imbalance upon the axis of rotation 16 of a rotating system 10" of the type shown in FIG. 1C.

With respect to pneumatic tires for automotive vehicles, couple and static imbalances interact in ways that tend to move the tire's axis of rotation 16 in complex ways. The tendency of the axis of rotation 16 to be affected in the ways shown in FIGS. 2A and 2B may also be affected by mechanical and inertial constraints that are a function of the vehicle design. These constraints vary with the frequency of the imbalance excitation (vehicle speed dependant) and the constraints can be moderately weak at the resonance frequencies of the system. Depending upon the frequency, the constraints can be different in the vertical and the fore-aft directions. It should be noted that the movement of the rotational axis 16a, as depicted in FIG. 2A for the case of pure static imbalance, is entirely in directions perpendicular to the ideal axis 16, and therefore has no axial (lateral) component.

Steering Performance As A Function Of Tire/Wheel Imbalance

FIGS. 3A, 4A, 5A, 5C and 6A illustrate test results showing the effects of tire/wheel imbalance upon the phenomenon of steering performance loss (SP-Loss). These tests were conducted using balance weights applied to the wheel flanges of tire/wheel assemblies, and the tire/wheel assemblies were mounted on a test vehicle known to be particularly susceptible to steering performance loss. For the tests detailed hereinbelow, it can be seen that in most cases (i.e., all except for the test illustrated by FIG. 5C) the test vehicle exhibited poor ("not okay") steering performance with balanced tire/wheel assemblies (zero imbalance mass). As explained hereinabove, the results of these imbalance tests can be generalized to indicate the effects of tire and wheel non-uniformities. The amount of steering performance loss associated with each of the imbalance scenarios shown in the above-referenced FIGS. 3A, 4A, 5A, 5C, and 6A is derived from and rated by the subjective reports of steering performance by vehicle test drivers. The numerals 3, 5 and 7 on the vertical axis in each of the graphs of the referenced FIGS. 3A, 4A, 5A, 5C, and 6A are steering performance rating numbers which represent increasing steering performance. In general, a rating of 6 or higher is "OK", and 5 or lower is "NOK" (not okay). The horizontal axes of the FIGS. 3A, 4A, 5A, 5C, and 6A represent the mass (in grams) of balance weights which were added on each flange in order to induce a desired magnitude and type of imbalance (e.g., pure static, or pure couple imbalance). Before adding the test weights, all of the tire/wheel assemblies on the test vehicle were statically and dynamically balanced to eliminate, as much as possible, any pre-existing static and couple imbalance; true running wheels and excellent uniformity tires were employed; and to avoid adding any couple imbalance to tests of added static imbalance, the test weights were added to both flanges of the wheel. For example, a 5 gram imbalance mass shown on the test result charts means two 5 gram balance weights, one added on each wheel flange (i.e., on opposite sides of the tire/wheel equatorial plane). For FIGS. 3A, 4A, and 5A, illustrating tests of pure static imbalance, the two balance weights were added at the same rotational angle on each flange. When a static imbalance is imposed on an otherwise balanced tire/wheel assembly, it is referred to as a residual static imbalance (RSI). In the context of the present invention, RSI will generally preferably mean a residual static imbalance which is sufficient to have a positive effect on steering performance.

Referring to FIG. 3B, a test vehicle 20 was outfitted with a single rear-mounted tire/wheel assembly 22 having static imbalance imposed upon the wheel by a set of flange-mounted balancing weights 24 (thus "static imbalance weights") arranged so as to induce a static imbalance in the tire/wheel assembly. (The two circles shown in the locations of each wheel correspond to the flanges of the wheels to which the imbalance weights, shown by dots, were affixed.) FIG. 3A shows the test driver's subjective evaluation of steering performance as a function of the amount of mass (in grams) used to provide a static imbalance in the single rear-mounted tire/wheel assembly 22. In summary, FIG. 3A demonstrates that a single rear-mounted tire/wheel assembly having a controlled amount (e.g., more than 5 grams on each flange) of RSI incorporated therein has a beneficial effect upon a given vehicle's steering performance. Generally, the more RSI incorporated into the tire/wheel assembly, the better the effect on steering performance as well as on steering performance robustness. However, an upper limit for RSI of 20 grams on each flange (i.e. 40 grams in total) was empirically determined as being the maximum RSI that could be incorporated, at least in relationship with that specific test vehicle 20, without producing vehicle vibrations that were noticeable by the vehicle's driver or passengers.

FIGS. 4A and 4B show the effect on steering performance resulting from mounting a single front-mounted tire/wheel assembly 26 having a set of flange-mounted balancing weights 24a (compare 24, FIG. 3B) arranged so as to impose residual static imbalance (RSI) on the single tire/wheel assembly 26 on a test vehicle 20a (compare 20, FIG. 3B). The test drivers' subjective feel for steering performance, as indicated in the vertical axis of FIG. 4A, indicates that RSI in a single front-mounted tire/wheel assembly 26 of as little as 5 grams on each flange can significantly improve steering performance. Comparing FIGS. 4A and 3A, it is apparent that when a single one of four tire/wheel assemblies incorporating RSI is a front tire/wheel assembly 26, rather than a rear tire/wheel assembly 24, the beneficial effects upon steering performance were generally more effective.

FIGS. 5A and 5B show the effect on steering performance resulting from adding RSI to all four wheels 28 of a test vehicle 20b. The test driver's subjective feel for steering performance, as indicated in the vertical axis of FIG. 5A, indicates that introducing RSI in all four tire/wheel assemblies 28 has an even more beneficial effect than in the previous two tests (compare FIGS. 4A and 3A).

FIGS. 5C and 5D show the effect on steering performance resulting from introducing a pure couple imbalance (no static imbalance) on a single front-mounted tire/wheel assembly 29 on a test vehicle 20c. Note that, unlike the other tests illustrated by FIGS. 3A, 4A, 5A, and 6A, this test vehicle 20c exhibited a high steering performance rating with zero imbalance. As shown in FIG. 5D, balance weights which were added to introduce couple imbalance were mounted on opposite flanges, 180 degrees apart to assure the addition of a pure couple imbalance. FIG. 5C indicates that the test vehicle 20c had excellent steering performance with little or no imbalance, but a couple imbalance generated by 10 grams or more on each flange of a single front-mounted tire/wheel assembly 29 can produce poor steering performance. The steering performance did not recover from the NOK rating level (4.0) even out to as much as 40 grams per flange of added couple imbalance (results above 20 grams per flange not shown in FIG. 5C).

FIGS. 6A and 6B show the effect on steering performance resulting from introducing an imperfect static imbalance (dynamic imbalance having a static component plus a moderate couple component) on a single front-mounted tire/wheel assembly 30 on a test vehicle 20d. FIG. 6A shows that the single assembly 30, with a mixed static and couple imbalance, has a mostly detrimental effect on steering performance. Although a 5 gram per flange mixed imbalance appears to help steering performance, a higher amount of imbalance mass does not help, and may even aggravate steering performance. Other tests, such as the test illustrated by FIGS. 5C and 5D, have shown that a vehicle/tire/wheel combination having excellent steering performance with balanced tires/wheel assemblies, can exhibit steering performance loss when sufficient couple imbalance is added.

In summary, improved steering performance and steering performance robustness is best effected by minimizing couple imbalance and by simultaneously implementing a suitable amount of residual static imbalance in the vehicle's tire/wheel assemblies, preferably all of them. It is also important to note that this concept works across very different vehicles: vehicles with hydraulic or electric power steering or with a basic mechanical steering system, vehicles with front, rear or all wheel drive, etc. Furthermore, since theory indicates that the steering performance effects are due to beneficial radial/tangential force variation and detrimental lateral force variation, this conclusion can be extended to read that improved steering performance and steering performance robustness is best effected by minimizing lateral force variations and by simultaneously implementing a suitable amount of radial and/or tangential force variation in one or more of the vehicle's tire/wheel assemblies, preferably all of them.

Principle of Additivity and Concept of Steering Robustness Level (SRL)

As illustrated in FIGS. 3A–5A, static imbalance has a positive but non-linear effect on steering performance: depending upon the level of static imbalance that is already achieved, the addition of an additional 5 grams per flange of static imbalance causes a big improvement, a small improvement, or no improvement at all, in steering performance. As illustrated in FIG. 5C, couple imbalance has a negative and non-linear effect on steering performance: depending upon the level of couple imbalance that is already achieved, the addition of an additional 5 grams per flange of couple imbalance causes a big drop, a small drop, or no drop at all, in steering performance. Moreover, it must be noted that if the curve describing the effect of couple imbalance is mirrored vertically, we basically obtain a curve that is similar to the curves describing the effect of static imbalance. Furthermore, a lot of other factors having a positive or a negative effect on steering performance have been identified, and they also seem to affect steering performance in a non-linear way. The effects of all the factors tend to add to or subtract from each other (additive behavior). Steering Robustness Level (SRL) represents the additive combination of all the beneficial and detrimental factors from any origin (vehicle/road/driving conditions, tire/wheel assembly characteristics, etc.). FIG. 6C shows representative SRL curves 61 and 62 which plot steering performance rating on the vertical axis versus Steering Robustness Level on the horizontal axis. The SRL curves 61 and 62 illustrate the (positive and non-linear) effect of SRL on steering performance. If beneficial contributions are much stronger than detrimental contributions, the SRL can achieve a high enough level to allow the vehicle to operate in the right hand, plateau, portion of the SRL curve 61, 62, with a high steering performance rating (OK or better steering performance). If negative contributions are much stronger than positive contributions, the SRL will be at a low level, causing the vehicle to tend to operate in the left hand portion of the SRL curve 61, 62, with a low steering performance (NOK or worse, indicating severe steering performance loss). In the intermediate situation where positive and negative contributions are similar, the vehicle will tend to operate in the mid part of the SRL curve 61, 62 and exhibit possibly large steering performance variations and low test repeatability, due to small uncontrolled SRL variations during the test(s). From a tire manufacturer's point of view, the Steering Robustness Level can be split into tire-based SRL (intrinsic) and test-based SRL (extrinsic). As an example, the SRL curves 61 and 62 illustrate the result of using various levels of static or couple imbalance, or any other extrinsic SRL variations, to compare two tires manufactured with two different tire constructions (arbitrarily labeled "A" and "B"). The SRL curve 61 for the tire with tire construction A shows that the tire construction A has a higher intrinsic steering performance robustness than the tire with tire construction B (plotted as SRL curve 62), because the tire construction A SRL curve 61 features a wider plateau at a high steering performance rating, which means that it is able to maintain a higher steering performance under more severe test conditions, in terms of extrinsic Steering Robustness Level. The same approach can be used to compare the steering performance robustness of different vehicles, different roads, different test conditions, etc.

Steering Performance As A Function Of Tire Imbalance

In addition to the tests described hereinabove where imbalance was produced by adding weights to wheel flanges, further tests were conducted to determine the effect of tire mass non-uniformities on steering performance and steering performance robustness. Tire non-uniformities were simulated and controlled by means of various-sized lead weights glued at various locations on one or more of the tires on a test vehicle. These tests were conducted on a test vehicle known to be particularly susceptible to steering performance loss in combination with tires having a tire construction known to display good and robust steering characteristics. The tests revealed that for the tire sidewall, shoulder area or bead area, 1.5 to 3 grams of couple imbalance are sufficient to induce a substantial degradation of steering performance. Attaching a lead weight inside a tire close to its circumferential centerline has no negative effect on steering performance. Also, attaching imbalance weights symmetrically on both sides of the tire, either in the sidewall, the shoulder area or the bead area, has no negative, but a positive effect on steering performance. This is in line with the test results detailed hereinabove concerning the addition of static imbalance by mounting balance weights symmetrically on opposing wheel flanges, although the vibrations generated by tire mass non-uniformities are somewhat more complex than the vibrations generated by wheel mass non-uniformities. Any weight addition on the tire that was asymmetric with respect to the equatorial plane (e.g., one lead weight glued on each shoulder or sidewall but oriented at different rotational angular locations, or even one lead weight glued only on one shoulder or sidewall) was detrimental to the vehicle steering performance and triggered steering performance loss. This is in line with the test results detailed hereinabove concerning the addition of couple imbalance, although the vibrations generated by tire mass non-uniformities are somewhat more complex than the vibrations generated by wheel mass non-uniformities.

The importance of symmetry about the equatorial plane was further highlighted by an experiment wherein two, three, or four balance weights of equal masses were attached to each sidewall of a tire with known good steering performance, all at the same radial location, and with evenly spaced rotational angular locations about the axis of rotation on each sidewall. A steering performance comparison was made between tire configurations having weights at the same rotational angular locations on both sidewalls (in phase) versus at different (out of phase) rotational angular locations on each sidewall (a 90, 60 or 45 degree phase difference, respectively, for configurations with two, three, or four balance weights per sidewall). In-phase, i.e., symmetric weight distributions about the equatorial plane gave good, un-reduced steering performance ratings, and asymmetric (out of phase) configurations gave lower steering performance ratings. FIGS. 6D and 6E illustrate, respectively, a symmetric and an asymmetric configuration, in the case of two balance weights on each shoulder of a tire. (The latter can be termed a second order tire mass non-uniformity.)

Referring to FIG. 6D, there is shown in schematic format a tire 65 having two shoulders 66: a left shoulder 66a and a right shoulder 66b. For illustrative sake, the tire 65, by itself, is assumed to be perfectly uniform. On the left shoulder 66a are attached two balance weights 68a and 68c, positioned 180 degrees apart. On the right shoulder 66b are attached two balance weights 68b and 68d, also positioned 180 degrees apart. It can be seen that if, for example, all of the balance weights 68 (68a, 68b, 68c, 68d) are equal in mass, then there will be no static imbalance imposed by the balance weights 68 positioned as shown. Since the balance weights 68b, 68d are positioned on the right shoulder 66b in phase with the balance weights 68a, 68c on the left shoulder 66a, i.e., at the same rotational angles, there will be no couple imbalance as long as the balance weights 68a and 68b are of equal mass and also the balance weights 68c and 68d are of equal mass (i.e., there is a symmetric weight distribution about the equatorial plane of the tire 65). Furthermore, if the balance weights 68a and 68b are of equal mass, and also the balance weights 68c and 68d are of equal mass, but the (equal) masses of the balance weights 68a and 68b are suitably different from the (equal) masses of the balance weights 68c and 68d, then a static imbalance without couple imbalance would be introduced to the tire 65. The tire 65 can be said to have a symmetric second order mass non-uniformity (with or even without static imbalance), and higher order symmetric weight distributions such as this have a beneficial effect on Steering Robustness Level (SRL), by causing tangential and/or radial force variation when the tire 65 is rotated, especially when rotated under load on a supporting surface (e.g., a road).

Referring to FIG. 6E, there is shown in schematic format a tire 65' having two shoulders 66': a left shoulder 66a' and a right shoulder 66b'. For illustrative sake, the tire 65', by itself, is assumed to be perfectly uniform. On the left shoulder 66a' are attached two balance weights 68a' and 68c', positioned 180 degrees apart. On the right shoulder 66b' are attached two balance weights 68b' and 68d', also positioned 180 degrees apart. It can be seen that if, for example, all of the balance weights 68' (68a', 68b', 68c', 68d') are equal in mass, then there will be no static imbalance imposed by the balance weights 68' positioned as shown. Although the balance weights 68b', 68d' are positioned on the right shoulder 66b' out of phase (asymmetrically) with the balance weights 68a', 68c' on the left shoulder 66a', i.e., not at the same rotational angles, there will be no couple imbalance, at least if all masses are equal. The tire 65' can be said to have an asymmetric second order mass non-uniformity (with or even without couple imbalance), and higher order asymmetric weight distributions such as this have a detrimental effect on SRL, by causing lateral force variations (e.g., wobbling moment variations at wheel axis) when the tire 65' is rotated under load on a supporting surface.

Non-Uniformities in Tires and Wheels

A variety of non-uniformities in tire and wheel construction can be utilized to implement the methods of the present patent for improving steering performance robustness. Beneficial non-uniformities, i.e., those producing radial and/or tangential force variations but not lateral force variations, fall into three general categories: mass non-uniformity, dimensional non-uniformity, and stiffness non-uniformity. Detrimental non-uniformities, i.e., those producing lateral force variations, also fall into the same three general categories.

Mass non-uniformity includes, for example, static imbalance (beneficial) and couple imbalance (detrimental), and can occur in the tire and/or in the wheel. Beneficial mass non-uniformity can be designed into the tire or wheel; random occurrences of detrimental and beneficial mass non-uniformities in the tire and/or in the wheel can be controlled to be within empirically-determined limits using, for example, tire uniformity machines and tire/wheel balancing equipment; and/or suitable excess mass can be intentionally added-on to tires or wheels.

Dimensional non-uniformity includes, for example, radial runout (beneficial) and detrimental non-uniformities such as lateral runout, tread snaking (lateral tread distortion), tire skewness (asymmetric radial run-out with shoulders in counter-phase), wheel skewness, and non-uniform (tapered) wheel offset. Dimensional non-uniformities can be purposely implemented and/or controlled during the design and manufacturing of tires and/or wheels.

Stiffness non-uniformity includes, for example, tire tread, belt, and/or sidewall stiffness which varies with the rotational angle around the tire. The stiffness non-uniformity can be beneficial as long as it is symmetric along every meridional section of the tire, e.g., equal stiffness in both sidewalls of a given meridional section. Stiffness non-uniformities can be purposely implemented and/or controlled during the design and manufacturing of tires.

Since the effects of mass, dimensional and stiffness non-uniformity are essentially additive, it is desirable to use more than one method simultaneously in order to achieve a required steering performance and steering robustness level. This enables one to utilize smaller magnitudes of individual non-uniformities to achieve a certain steering performance while at the same time not exceeding acceptable vehicle vibration levels.

The main concept of the present invention is to introduce a controlled amount of stiffness non-uniformity into a tire, thereby generating fore-aft and vertical force variations excited by the tire when operated on a vehicle. The effect is similar to that of a mass non-uniformity, which will be discussed first.

Mass Non-Uniformities

In the tests described hereinabove, mass non-uniformities were introduced by means of balance weights added to the wheel. In practice, this would be an unreliable way to implement the desired RSI because it takes vehicle performance out of the control of the manufacturers and relies instead on the vehicle operator (and by proxy their chosen mechanics) to implement the RSI necessary for proper vehicle performance. Furthermore, purposely implementing an imbalance is counter to the common knowledge and therefore likely to be resisted. Thus there is an advantage to implementing beneficial mass non-uniformity (e.g., RSI) in the tire, such as by design of the tire or by control of the manufacturing process. A further advantage of a tire solution will become evident in the following discussion.

An article in *Tire Science and Technology* by Stutts et al. entitled "Fore-Aft Forces in Tire-Wheel Assemblies Generated by Unbalances and the Influence of Balancing" (TSTCA, Vol. 19, No. 3, July–September, 1991, pp. 142–162), observes that "during drum tests [road-wheel tests of tire-wheel assemblies, e.g., on a TUM]. . . beyond certain speeds, the horizontal force variations or so-called fore-aft forces were larger than the force variations in the vertical direction." The article goes on to postulate and then prove a theory explaining this phenomenon. In particular, the article shows that unbalanced mass in or near the tread portion of the tire can produce this result, and furthermore shows that the effect remains to a certain extent even if the tire/wheel assembly is balanced at the wheel rim (flange). For an explanation of this effect, refer to FIGS. 7A and 7B. As explained hereinabove, the centrifugal force due to a rotating mass is proportional to the mass and to the radius of the location of the mass. Tires are generally balanced when they are freely rotating, as in FIG. 7A, where a tire 70 mounted on a wheel 73 is rotating about an axis of rotation 71. The tire 70 has a mass non-uniformity comprising an excess mass 74 having a mass $M_t$ and located near the outer circumference of the tire 70 (e.g., in the tread) at a radius $R_t$ from the axis 71. To balance the excess mass 74, a balance weight 72 having a mass $M_w$ is attached to the rim or flange of the wheel 73 which is at a fixed radius $R_w$. For simplicity of illustration, only two dimensions are shown and discussed. It should be understood that to avoid couple imbalance (lateral force variation), the masses $M_t$ and $M_w$ must be appropriately distributed laterally relative to the equatorial plane of the tire/wheel assembly. For the tire mass $M_t$, a meridional symmetry condition must be strictly respected, wherein the mass non-uniformity $M_t$ is symmetrically distributed laterally relative to the equatorial plane of the tire/wheel assembly. For the wheel-mounted mass $M_w$, the mass needs not be distributed symmetrically about the equatorial plane, provided no couple imbalance is generated. For example, in the case of wheels that do not allow attaching balance weights symmetrically with respect to the equatorial plane, the mass $M_w$ can be understood as a set of two balance weights having unequal masses $m_1$, $m_2$ (such that $m_1+m_2=M_w$), mounted in such a way that the lack of geometrical symmetry is compensated for, while keeping zero couple imbalance, i.e., $m_1/m_2=(l_2/l_1)*(r_2/r_1)$, as described hereinabove with reference to FIG. 1D. The mass of the balance weight $M_w$ is selected according to the equation $M_tR_t=M_wR_w$, thereby counterbalancing centrifugal forces to produce a net centrifugal force of zero (assuming that the balance weight(s) 72 is located 180 degrees around from the excess mass 74). Referring now to FIG. 7B, when the balanced tire 70 is rolling in contact with a road surface 76, the radius of the excess mass 74 will be reduced from $R_t$ to $R_t'$ whenever the tread portion where the excess mass 74 is located comes into contact with the road 76. Whenever this happens, the inertial forces (e.g., centrifugal force) due to the excess mass 74 are temporarily cancelled, and the balance weight 72 on the rim becomes an imbalance because its centrifugal force $M_wR_w$ is still present. Thus a periodic force variation is generated in the rolling tire 70, whether or not it is balanced, providing the excess tire mass 74 is primarily located in the tread region of the tire.

Further analysis shows that a localized mass non-uniformity (excess mass) on a tire has some other specific effects that also cannot be compensated for by adding balance weights on the wheel flanges. Masses produce inertia forces when they follow non-linear trajectories and/or if they have a non-constant speed (i.e., undergoing acceleration/deceleration). In the case of a mass in a rotating vehicle tire, the correct way to measure or compute these inertia forces is relative to a coordinate system (frame of reference) attached to a level surface upon which the tire/vehicle is moving (e.g., a smooth, level road). Such a coordinate system can be considered as an inertial reference system, if we neglect the movements of the earth. It is, however, convenient to consider the inertia forces in a "spinning wheel" frame of reference relative to an observer attached to the axis of rotation at the center of the tire/wheel assembly and spinning with it, rather than relative to an observer fixed to the road. In the spinning wheel frame of reference centrifugal forces are very convenient, because they can be very simply measured or predicted with respect to the spinning wheel, but they reflect the true inertia forces only if the mass non-uniformity follows plane circular (constant radius) trajectories about the axis of rotation (which is substantially the case for wheel balance weights); and also the speed must remain constant. In the case of non-circular trajectories about the axis of rotation, as, for example, would be the case for weights attached to a tire tread or sidewall area while in loaded/rolling condition, the calculation of centrifugal force is not sufficient to calculate the true inertia forces, and correction terms need to be added to the calculation (e.g., terms of angular acceleration, Coriolis acceleration, and relative radial and lateral accelerations). In simple words, any speed or curvature changes along the trajectory of the mass non-uniformity cause inertia forces (similar to the effects felt by a passenger sitting in a vehicle following a curvy and/or hilly road).

FIGS. 7C and 7D (with reference to FIGS. 7A, 7B, 7E, and 7F) are graphs illustrating predicted forces and moments caused on the environment of a tire 70 by an exemplary 6 gram mass 74, $M_t$ attached close to the tread surface at the equatorial plane of a perfectly uniform tire 70 mounted on a wheel 73, which is mounted on a vehicle (not shown), wherein the tire/wheel assembly 70/73 is loaded and rolling at 120 km/h on a level road surface 76, using the simplifying assumption that the trajectory of the tire mass non-uniformity 74 is constant with time. The term 'environment' is meant to include the wheel 73 axis of rotation 71, the tire 70, and the road 76. The way the forces caused by tire/wheel assembly 70/73 mass non-uniformities are transmitted to and distributed respectively to a wheel axis 71 and a road 76 depend on the dynamic properties of the tire 70 mounted on the wheel 73 and of the suspension of the vehicle upon which the tire/wheel assembly 70/73 is mounted. We will, however, use the predictions illustrated in the graphs of FIGS. 7C and 7D to illustrate qualitatively what happens at the wheel axis 71. The idealized "perfectly uniform tire 70" is assumed to be perfectly balanced, with no static or couple imbalance, after the excess mass 74 is added to the tire 70 (by adding, for example, a suitable mass $M_w$ as balance weights 72 on the flanges of the wheel 73). In FIGS. 7C and 7D, the forces and moments are shown vertically versus the (time related) position of the excess mass 74 along the circumference of the tire 70, with the circumferential position indicated in degrees of rotation (zero degrees being at the center of the footprint area). FIG. 7C illustrates vertical forces (curve 77) and fore-aft forces (curve 78). It can be seen that, for the major part of the trajectory of the excess mass 74, away from the footprint area, the vertical and fore-aft forces are substantially zero, because the tire/wheel assembly 70/73 is well re-balanced. When approaching, passing through and leaving the footprint area, the vertical force curve 77 respectively shows high/low/high values (peaks), because the trajectory of the excess mass 74 features successively high/low/high curvature (for example, there is essentially zero curvature in the footprint area). The negative vertical force value in the mid footprint area represents the temporary imbalance that was described and explained hereinabove with reference to FIGS. 7A and 7B.

The directions of the vertical force peaks are indicated by the arrows 75a in FIG. 7E wherein a positive vertical force is directed downward (away from the axis of rotation 71).

The fore-aft force curve 78 in FIG. 7C shows a negative force peak as the excess mass 74 enters the footprint area (at a negative rotational angle), and shows a positive force peak as the excess mass 74 leaves the footprint area. The negative and positive fore-aft force peaks are due to respective deceleration and acceleration of the excess mass 74 (and tire tread portion to which it is attached) which normally occurs to tire tread upon respectively entering and leaving the footprint area. The deceleration and acceleration directions are indicated by the arrows 75b in FIG. 7F, and the forces due to the excess mass 74 and acting on the 'environment' (wheel 73 axis of rotation 71 and the road 76) are indicated by the arrows 75f in FIG. 7F, wherein a positive fore-aft force has a direction corresponding to the vehicle's direction of motion as indicated by the arrow 75e. FIG. 7D illustrates (curve 79) the moment about the axis of rotation 73 that goes together with the fore-aft force shown by curve 78. It can be seen that the moment curve 79 has a negative peak when the excess mass 74 enters the footprint area, and has a positive peak upon leaving. The moment directions are indicated by the arrows 75c in FIG. 7F, wherein a positive moment direction is in the same direction as the tire's direction of rotation as indicated by the arrow 75d.

Methods Of Incorporating Beneficial Mass Non-Uniformity In Tire/Wheel Assemblies A concept of the present invention takes advantage of the effects of mass non-uniformities described hereinabove, because the inventors desire to produce a controlled amount of fore-aft and radial force variation, and also desire to maintain these beneficial force variations while allowing anyone mounting a tire to normally balance his tire/wheel assemblies. Thus an inventive method for improving steering performance and steering performance robustness is to generate beneficial force variations by incorporating suitable amounts of excess mass 74 (i.e. a mass non-uniformity) into a tire 70 as close to the outer circumference (e.g., tread region) as possible. Since beneficial force variations may come from a static imbalance but not from a couple imbalance, the excess mass 74 added to the tire 70 must be distributed meridionally symmetric about the equatorial plane of the tire (i.e., the tire tread, belt package and carcass).

FIGS. 8A and 8B are circumferential cross sections of a sector of tires illustrating various methods for adding mass non-uniformities (e.g., excess mass 74) according to the invention (shading of cross sectioned areas eliminated for illustrative clarity). A quick and easy way to add the excess mass 74 to a tire is to simply apply a patch (not shown) to the inner surface (innerliner 86) of the tire 80, preferably under the tread 82 region. An alternative would be to add an extra piece of fabric 89 (i.e., any suitable fabric including tread belt or carcass ply material) to the carcass 90 (preferably in the tread region) or to the tread belt 84 package or tread 82 rubber of a tire 80'. Referring to FIG. 8B, a sector of tire 80' is shown with the tread 82, one or more belts 84 (belt package), and a carcass 90 comprising one or more carcass plies 85, a piece of fabric 89, and an innerliner 86, all shown in cross section. The inside surface (innerliner 86) of the carcass 90 is shown extending from the tread 82 region down to a bead 88 and an apex 87, about which the carcass 90 wraps. The fabric 89 is a width W' in a sector 81' of the tire 80', and is made of a material suitable for providing the desired excess mass 74, while also having physical characteristics appropriate for tire usage such as bending and durability. (As discussed hereinbelow, stiffness of the fabric 89 may be purposely adjusted, according to the present invention.) The fabric 89 can reside entirely in the tread 82 region, or it can extend to the bead(s) 88 and wrap around the bead(s) 88 to end(s) 89a, as shown in the portion 89a of FIG. 8B. In order to prevent the introduction of any couple imbalance, the two fabric ends 89a are positioned symmetrically about the circumferential plane of the tire 80'. Thus, an equal mass of fabric 89 is positioned on either side of the circumferential plane of the tire 80'. The mass non-uniformity beneficial effect of the fabric 89 is only slightly influenced by which tire layer 82, 84, 85, 86 is selected for positioning of the fabric 89, so normal tire design considerations can be factored into this selection process. As illustrated, the fabric 89 is positioned between the innermost carcass ply 85 and the innerliner 86, but an essentially equivalent embodiment of the invention could, for example, place the fabric 89 between others of the layers 82, 84, 85, 86, or even in the midst of a layer, such as embedded in the tread 82 rubber, or placed between belts 85, or attached on the inside surface of the innerliner 86, or on an outside surface of the tire, such as the sidewall (not shown) near the shoulder (not shown).

It should be noted that the added fabric piece embodiment just described includes within its scope the idea of adding a "patch" to the tire, since the "fabric" comprises all manner of materials compatible with tire construction (including metals), and applying the patch to an outside surface of one of the tire layers is equivalent to adding a fabric piece to that layer.

A more elegant way to add beneficial mass non-uniformity (e.g., excess mass 74) is to create a "heavy splice" (illustrated for the tire 80 in FIG. 8A), thereby taking advantage of an existing mass non-uniformity in all tires: the splices of various tire layers where, for example, the ends 85a, 85b of the carcass plies 85 (one ply 85 shown) overlap in order to form a complete circle of the carcass plies 85. Other splices include, for example, tread 82 material (merging along the meridional line 83), one or more tread belts 84 (one belt 84 shown with overlapping ends 84a, 84b), and innerliner 86 material (with overlapping ends 86a, 86b). Other splices in the bead 88 and in the sidewall/apex area close to the beads 88 can also be used to produce desired excess mass 74, but are not preferred for reasons which will become clear in the following discussion (primarily because bead mass non-uniformities can be approximately counteracted by balance weights on the wheel). For example, the bead 88 has a splice or at least two overlapping ends 88a, 88b. For example, an apex 87 has a splice where two ends merge in the shaded region 87ab.

Typical tire construction methods attempt to distribute various splices around the circumference of the tire, but in the inventive embodiment of the tire 80, for example, the splices of different tire layers are aligned so that they all occur approximately within the same meridional sector. The amount of mass non-uniformity introduced can be controlled by varying the number of splices which are within the same meridional sector 81, and also by varying the amount of overlap of each splice (e.g., width W). In addition, changing to a thicker innerliner 86 material will further increase the mass non-uniformity due to the innerliner splice 86a/86b. An advantage of using splices to create beneficial mass non-uniformity in a tire, is that properly-implemented splices are inherently meridionally symmetric.

An alternate approach consists of creating several "heavy splices" (2, 3, 4, etc . . . ) around the tire circumference, in order to generate more frequent fore-aft and radial force peaks. This method generates more frequent beneficial fore-aft and radial force peaks (i.e., tangential force variation and radial force variation, respectively).

Another embodiment of beneficial mass non-uniformity, similar to one or more heavy splices, is one or more sectors of a tire component having excess mass. For example, a length W of tread 82 material (e.g., at the end 82a of the tread) is made of a heavier material than the remainder of the tread 82, or the tread pattern is adjusted to incorporate excess mass at one or more locations around the tread circumference (e.g., lateral bars or a wider tread portion jutting out from the tread shoulder). Alternatively, components such as the belts 84, plies 85, innerliner 86, apex 87, and beads 88 could be provided with heavier material in one or more sectors. Also, a sector having excess component mass could be advantageously superimposed on the sector 81 where one or more splices are located.

It should be noted that the term "excess mass" as used herein is intended to include not only an excess of mass in one or more circumferential locations; but also includes one or more circumferential locations having a lack of mass relative to the remainder of the circumferential locations. After all, a lack of mass in a first location relative to a second location equates to an excess of mass in the second location relative to the first location.

Given the inventive concept of adding controlled mass non-uniformities (one or more excess masses) to a tire/wheel assembly, and given the examples disclosed hereinabove, no doubt many other ways to incorporate the inventive excess mass(es) into tire/wheel assemblies will occur to the reader skilled in the relevant arts. All such means of incorporating the inventive excess mass(es) are intended to be within the scope of the present invention, including methods which combine beneficial mass non-uniformity with other beneficial forms of non-uniformities (in particular dimensional non-uniformity and stiffness non-uniformity).

It should be noted that, in order to be beneficial, the inventive excess mass(es) introduced in a tire must not produce any kind of lateral force variations such as are caused by asymmetry about the equatorial plane (e.g., couple imbalance). Therefore, when tires are manufactured with built-in beneficial mass non-uniformity, they are preferably tested for tire uniformity and corrected or rejected as needed to assure minimum lateral force variations, for example, forces caused by: overturning (i.e. camber) moment variation, couple imbalance, lateral run-out, tread snaking, radial run-out skewness, etc. For example, lateral force variations in tires should be less than 12 pounds peak-to-peak. This tire uniformity testing preferably occurs after the excess mass has been incorporated into the tire, but could be performed before the excess mass has been incorporated into the tire by means of a patch, for example. In the later case, the patch would have to be positioned well enough that any possible couple imbalance introduced by the patch could be overcome either by further factory testing and correction, or by post-production dynamic balancing of the tire mounted on a wheel.

Steering Performance Robustness Test Method

The inventors tested the mass-non-uniformity-in-the-tire concept with an inventive test method which was designed to not only test the instantaneous steering performance but to also indicate the steering performance robustness of the tested tire/wheel assembly. In other words, for each tested assembly the test is designed to answer questions such as: (a) What is the immediate steering performance? (b) How bad/noticeable is the resulting vibration? (c) How resistant is the assembly to steering performance loss in the long term (over the life of the tire)? (d) If the assembly exhibits immediate steering performance loss, how much correction is needed to provide acceptable steering performance.

The question (c) concerns robustness of steering performance and is predictive in nature. It is known that over the life of a tire, especially while mounted on a wheel and used on a vehicle, the uniformity of the tire/wheel assembly can change, even if it was initially very uniform (dimensionally and in terms of force variations). This is because of the visco-elastic nature of a tire and the fact that the tire ply doesn't always follow an equilibrium shape. Another important factor determining tire uniformity is how well the bead seats on the wheel rim, and how much this contact may change with service conditions such as heavy braking, heavy cornering, etc. Examples of other factors determining tire uniformity include: tread wear (both a change in wear distribution as well as local wear due to braking and many other factors), and "asymmetric flat-spotting" (when parking with tires in a steered position, or parking on a laterally inclined surface, or partly on the edge of a curb, a hot tire may deform in an asymmetric way). Also, tires as well as the rims can, due to improper service conditions such as hitting a curb or a pothole, undergo changes which can ultimately result in changes in the mass uniformity (e.g., balance), the stiffness uniformity, or the dimensional symmetry of a tire/wheel assembly about its equatorial plane. Moreover, vehicle condition varies during its life, and road/driving conditions are also variable in essence and have an effect on Steering Robustness Level (SRL). The question (d) also concerns steering robustness. In essence, the test method seeks to determine the nature of the intrinsic SRL factors, and where the SRL "plateau" lies relative to the SRL total of intrinsic and extrinsic factors existing for the tested combination of tire, wheel and vehicle.

As described hereinabove, the inventors have determined that increasing static imbalance has a positive effect on steering performance, while increasing couple imbalance has a negative effect on steering performance. Thus a test design which subjects a test tire/wheel assembly to a progression of balance conditions from large static imbalance (only), decreasing to no imbalance (i.e., a statically and dynamically balanced assembly), then increasing to large couple imbalance (only), provides a calibrated scale of operating conditions from favorable through neutral to unfavorable. The farther into the unfavorable range of operating conditions that a test tire/wheel/vehicle combination can operate while still having OK (acceptable) steering performance, then the more robust that test tire/wheel/vehicle combination is against steering performance loss. Stated in terms of the SRL concept discussed hereinabove with reference to FIG. 6C, the progression of balance conditions imposed by the inventive test method causes the extrinsic portion of the tire/wheel/vehicle combination's SRL to progress from positive through neutral to negative values, in order to determine the shape, magnitude and relative location of the SRL "plateau" for the SRL curve resulting from a sum of the intrinsic and extrinsic SRL portions characterizing the subject tire/wheel/vehicle combination. Thus the inventive test method includes within its scope not just a progression of balance conditions, but rather any progression of imposed conditions which cause the extrinsic SRL value to progress from positive through neutral to negative values. Of course the progression can go in the opposite direction, and depending on test results, may be limited to a portion of the overall range. In fact, testing can be done at selected extrinsic SRL values in any desired order. For example, if the testing at a high positive extrinsic SRL value produces poor steering performance, then the test may be aborted and the tire/wheel/vehicle combination may be declared inappropriate or un-usable. Or, for example, the progression of extrinsic SRL values may be halted as soon as a "not-okay" (NOK) steering performance result (or vibration level result) is obtained.

It should be noted that the inventive test method can be used to test the steering performance robustness of any tire construction (or even any tire/wheel/vehicle combination), regardless of how it has been changed. Although the test preferably uses wheel balance weight changes to produce various test conditions, these changes in mass uniformity of the tire/wheel assembly are not to be confused with intentional design changes of uniformity in, for example, the tire construction (e.g., tire design changes of mass, stiffness, and/or dimensional uniformity).

Stiffness Non-Uniformities

Stiffness variations in tire components are known to cause force variations, and for that reason are generally avoided in tire manufacturing by tire construction design constraints involving, for example, splice dimensions and placement. The concept of the present invention is to purposely alter the tire construction design in order to produce a controlled amount of variation in stiffness around the tire circumference. Several advantages are inherent in this approach to improving steering performance and steering performance robustness. If done in a way which minimizes lateral force variations (LFV) (which are detrimental), the stiffness variation will introduce (beneficial) tangential force variations (TFV) and/or radial force variations (RFV), which are substantially unaffected by tire/wheel balancing. Furthermore, if the stiffness variation is induced by means of a splice (including coincident splices of different tire layers) then the stiffness non-uniformity will generally be accompanied by a mass non-uniformity (static imbalance or RSI) which is also beneficial, as detailed hereinabove. The inventors' tests have shown that the beneficial effects are additive, and indeed that is a basis of the inventive steering performance robustness test method detailed hereinabove. It is also known that, since tire stiffness generally affects the damping of vibrations (i.e., damping of force variations) in a tire, therefore stiffness variation is often accompanied by variation in the damping of vibrations. Since variation in the damping of force variations is essentially a perturbation of the force variations, any such damping effects are considered within the scope of the present invention's disclosure about the beneficial effects of certain force variations. For example, a perturbed radial force variation without any lateral force variation should be beneficial to steering performance and robustness, just as is the un-perturbed (un-damped) radial force variation without any lateral force variation.

Methods Of Incorporating Stiffness Non-Uniformity In Tires

The controlled increase in TFV/RFV (tangential force variations and/or radial force variations) according to this invention can be brought about by any controllable method which causes one or more sectors (meridional sections) of the tire to be either more or less stiff than the remainder of the tire. Referring to FIGS. 7A and 7B, tangential and radial force variation due to tire stiffness is generally caused by a variation in the force required to deform a rotating tire 70 as a sector of the tire passes through the flattened "footprint" where the tire contacts a supporting surface 76 (e.g., a road). In order to pass through the footprint, the tire's tread portion must bend, and the tire's sidewalls must buckle to accommodate the temporarily-reduced radius ($R_t'$ versus $R_t$) of the tread in the footprint. Therefore a change in bending stiffness of either the tread region and/or the sidewall regions of the tire will provide the desired TFV/RFV.

Preferred embodiments of this method are similar to some of the methods described hereinabove for producing a mass non-uniformity in a tire by means of a heavy splice 81 (illustrated for tire 80 in FIG. 8A), or by means of an added fabric piece 89 (illustrated for tire 80' in FIG. 8B). Both of the stiffness non-uniformity embodiments are designed to optimize the stiffness non-uniformity in order to produce the desired amount of TFV/RFV (which is, in turn, determined to be the amount of TFV/RFV needed to produce the desired steering performance and steering performance robustness). Incidental to the design is a certain amount of mass non-uniformity that will naturally accompany many of the tire designs for implementing stiffness non-uniformity. Since a mass non-uniformity is also advantageous, and since the effects of non-uniformities are additive, the combination of a mass non-uniformity and a dimensional non-uniformity is desirable and advantageously utilized in the methods of the present invention. Thus, for example, the width W of the heavy splice sector 81 is increased (especially for the stiffer belt 84 or ply 85 layers) both to increase the RSI excess mass, but also to circumferentially lengthen the excessively stiff portion of the tire, thereby increasing both mass non-uniformity and stiffness non-uniformity. By simultaneously increasing both non-uniformities, beneficial steering performance effects can be realized with smaller individual non-uniformities.

For the fabric piece 89 embodiment, the fabric width W' is selected to provide a desired amount of both mass and stiffness non-uniformities. The ratio between the two types of non-uniformities is primarily determined by the ratio of weight versus stiffness characteristics of the fabric 89, and by the positioning of the fabric 89. For example, a fabric 89 with a given total mass and shape, may have a higher stiffening effect when placed between belt 84 layers, compared to placement between the innerliner 86 and a ply layer 85, or compared to applying the fabric 89 as a patch on the surface of the innerliner 86. Also, there may be a synergistic effect by adding the fabric 89 to the same sector as the sector 81 where one or more splices are located. In another example, if the fabric 89 is shaped and/or positioned such that the stiffening effect is concentrated in the sidewalls, then the effect of the mass of the fabric 89 is reduced relative to the effect of the stiffness of the fabric 89 (due to the reduced radius of the excess mass's location).

In another embodiment of a beneficial stiffness non-uniformity, a sector of a tire component is provided with a different (less or preferably greater) stiffness than the remainder of the tire component. For example, a length W of the apex 87 material (e.g., the splice portion 87ab of the apex 87) is made of a stiffer material than the remainder of the apex 87. Alternatively, components such as the tread 82, belts 84, plies 85, or innerliner 86 could be provided with stiffer material in a sector. A sector with excess component stiffness could be advantageously superimposed on the sector 81 where one or more splices are located, and/or on the sector 81' where an extra fabric piece 89 has been applied. Another way to impart stiffness non-uniformity around the circumference of the tire is to vary the tread pattern. For example, one or more sectors of the tread can be given a different pattern, such as wider or narrower tread segments to produce more or less stiffness, respectively, in that sector(s). Of course this tread pattern variation would have to be substantially axially symmetric about the equatorial plane in order to prevent introduction of lateral force variation. The tread pattern variation (which is a way of providing a sector of a component with excess stiffness) could also be considered a form of dimensional non-uniformity combined with stiffness non-uniformity (and also possibly combined with mass non-uniformity). As stated hereinabove, such a combination is desirable as long as it produces TFV/RFV and not LFV.

Given the inventive concept of adding stiffness non-uniformities (possibly in combination with other beneficial non-uniformities) to a tire, and given the exemplary embodiments disclosed hereinabove, no doubt many other ways to implement the inventive methods in tires will occur to the reader skilled in the relevant arts. All such means of incorporating the inventive beneficial non-uniformities are intended to be within the scope of the present invention, including methods which combine beneficial stiffness non-uniformity with other forms of beneficial non-uniformities (in particular beneficial mass non-uniformity and beneficial dimensional non-uniformity).

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method of improving steering performance robustness in a vehicle, comprising:

mounting a plurality of tire/wheel assemblies on the vehicle, said plurality of tire/wheel assemblies including a number of front tire/wheel assemblies and a number of rear tire/wheel assemblies, each tire/wheel assembly comprising a tire mounted on a wheel, and imparting a controlled amount of stiffness non-uniformity to the tire which varies with the rotational angle around the tire in at least one of the tire/wheel assemblies.

2. A method of improving steering performance robustness in a vehicle, comprising:

mounting a plurality of tire/wheel assemblies on the vehicle, said plurality of tire/wheel assemblies including a number of front tire/wheel assemblies and a number of rear tire/wheel assemblies, each tire/wheel assembly comprising a tire mounted on a wheel;

imparting a controlled amount of stiffness non-uniformity to the tire in at least one of the tire/wheel assemblies; and selecting the at least one tire/wheel assemblies from one or more of the front tire/wheel assemblies.

3. Method, according to claim 1, characterized by the step of:

for the tire having a controlled amount of stiffness non-uniformity, imparting, at least one of a mass non-uniformity in the at least one of the tire/wheel assemblies with a dimensional non-uniformity in the at least one of the tire/wheel assemblies.

4. Method, according to claim 1, further characterized by the step of:

statically and dynamically balancing all of the plurality of tire/wheel assemblies.

5. Method, according to claim 1, characterized by the steps of:

imparting the stiffness non-uniformity meridionally symmetrically about the equatorial plane of the tire; and correcting the tire with the stiffness non-uniformity to assure minimum lateral force variation.

6. A method of improving steering performance robustness in a vehicle, comprising:

mounting a plurality of tire/wheel assemblies on the vehicle, said plurality of tire/wheel assemblies including a number of front tire/wheel assemblies and a number of rear tire/wheel assemblies, each tire/wheel assembly comprising a tire mounted on a wheel;

imparting a controlled amount of stiffness non-uniformity to the tire in at least one of the tire/wheel assemblies, wherein the stiffness non-uniformity is imparted to the tire with at least one heavy splice; and increasing the width W of each heavy splice, both to increase a localized excess mass, and to circumferentially lengthen a localized excess stiffness portion of the tire, thereby increasing both mass non-uniformity and stiffness non-uniformity.

7. Method, according to claim 6, further characterized by the step of:

selecting the fabric width W' and the fabric material to provide a desired amount of both mass and stiffness non-uniformities.

8. Method, according to claim 1, characterized by:

imparting the stiffness non-uniformity with at least one sector of a tire component having a different stiffness than the remainder of the tire component.

9. Method, according to claim 8, further characterized by:

imparting the different stiffness in at least one sector of an apex above each bead, causing stiffness non-uniformity in sidewalls of the tire.

10. Method, according to claim 8, further characterized by:

imparting the different stiffness in at least one sector of a tire tread having a pattern by varying the tread pattern.

11. Method, according to claim 1, characterized by:

the stiffness non-uniformity being a tire stiffness characteristic that varies with rotational angle about an axis of rotation of the tire.

12. A method of improving steering performance robustness in a vehicle, comprising:

mounting a plurality of tire/wheel assemblies on the vehicle, said plurality of tire/wheel assemblies including a number of front tire/wheel assemblies and a number of rear tire/wheel assemblies, each tire/wheel assembly comprising a tire mounted on a wheel; and imparting a controlled amount of stiffness non-uniformity to the tire in at least one of the tire/wheel assemblies, the stiffness non-uniformity, mass non-uniformity, and dimensional non-uniformity, each being a tire/wheel characteristic that varies with rotational angle about an axis of rotation of the tire.

* * * * *